United States Patent
Li et al.

(10) Patent No.: US 11,382,098 B2
(45) Date of Patent: Jul. 5, 2022

(54) SIDELINK TIMING CONTROL

(71) Applicant: QUALCOMM incorporated, San Diego, CA (US)

(72) Inventors: Junyi Li, Chester, NJ (US); Tao Luo, San Diego, CA (US); Jung Ho Ryu, Fort Lee, NJ (US); Sony Akkarakaran, Poway, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 116 days.

(21) Appl. No.: 16/878,566

(22) Filed: May 19, 2020

(65) Prior Publication Data

US 2020/0396734 A1 Dec. 17, 2020

Related U.S. Application Data

(60) Provisional application No. 62/861,914, filed on Jun. 14, 2019.

(51) Int. Cl.
*H04W 72/04* (2009.01)
*H04W 92/18* (2009.01)

(52) U.S. Cl.
CPC ... *H04W 72/0446* (2013.01); *H04W 72/0406* (2013.01); *H04W 92/18* (2013.01)

(58) Field of Classification Search
CPC ......... H04W 72/0446; H04W 72/0406; H04W 92/18; H04W 56/002; H04W 56/0025; H04W 56/0005
See application file for complete search history.

(56) References Cited

U.S. PATENT DOCUMENTS 10,334,615 B2 * 6/2019 Seo ............... H04W 72/1215
2017/0171880 A1 * 6/2017 Chae ............ H04W 72/0413
(Continued)

FOREIGN PATENT DOCUMENTS

WO WO-2019083343 A1 5/2019

OTHER PUBLICATIONS

"9 Sidelink", 3GPP Draft; (Release 14) TS 36.211-EA0_S09-SXX, 3rd Generation Partnership Project (3GPP), Mobile Competence Centre; 650, Route Des Lucioles; F-06921 Sophia-Antipolis Cedex; France vol. RAN WG1 Mar. 25, 2019 (Mar. 25, 2019), V14.10.0, XP051690742, 43 pages, Retrieved from the Internet: URL: http://www.3gpp.org/ftp/tsg%5Fran/WG1%5FRL1/DRAFT/Clean%5Fversions/36211%2Dea0%2Ezip [retrieved on Mar. 25, 2019].
(Continued)

*Primary Examiner* — Lan-Huong Truong
(74) *Attorney, Agent, or Firm* — Holland & Hart LLP

(57) ABSTRACT

Methods, systems, and devices for wireless communications are described. In some systems, a user equipment (UE) may communicate with other UEs via sidelinks during sidelink communication resources assigned by a base station. However, due to the propagation delay of signals in a wireless communications system, a first UE may receive a sidelink transmission from a second UE in resources delayed with respect to the resources used for transmission. If the delay results in a scheduling conflict (e.g., overlapping resources for reception), the first UE may transmit a timing request to resolve the conflict. In a first example, the base station may receive the request and configure a timing gap based on the request. In a second example, the timing request may indicate to the second UE a sidelink transmission timing adjustment for communicating with the first UE, and the second UE may determine whether to implement this timing adjustment.

28 Claims, 19 Drawing Sheets

(56) References Cited

U.S. PATENT DOCUMENTS

| | | | |
|---|---|---|---|
| 2017/0245245 A1* | 8/2017 | Kim | H04W 72/1284 |
| 2019/0014464 A1* | 1/2019 | Kuge | H04W 12/04 |
| 2019/0037539 A1* | 1/2019 | Jung | H04W 4/48 |
| 2019/0098589 A1 | 3/2019 | Chae et al. | |
| 2019/0101615 A1* | 4/2019 | Ten | G01S 5/10 |
| 2020/0245281 A1* | 7/2020 | Chae | H04W 72/048 |

OTHER PUBLICATIONS

International Search Report and Written Opinion—PCT/US2020/033760—ISA/EPO—dated Oct. 1, 2020.

* cited by examiner

SIDELINK TIMING CONTROL

CROSS REFERENCE

The present Application for Patent claims the benefit of U.S. Provisional Patent Application No. 62/861,914 by Li et al., entitled "SIDELINK TIMING CONTROL," filed Jun. 14, 2019, assigned to the assignee hereof, and expressly incorporated by reference in its entirety herein.

FIELD OF TECHNOLOGY

The following relates generally to wireless communications and more specifically to sidelink timing control.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support both access links and sidelinks. An access link is a communication link between a UE and a base station. In some examples, an access link may be referred to as a Uu interface. Specifically, the Uu interface may refer to an over-the-air interface for downlink transmissions, uplink transmissions, or both. A sidelink is a communication link between similar devices. For example, a sidelink may support communications between multiple UEs or may support communications between multiple base stations. In some examples, an access link may be referred to as a PC5 interface (e.g., supporting vehicle-to-everything (V2X) and/or vehicle-to-vehicle (V2V) communications between vehicles in a system). In some cases, a sidelink may be referred to as a device-to-device (D2D) link and may support unicast messaging, broadcast messaging, or both. In some wireless communications systems, both access link and sidelink communications may experience time delays due to signal propagation in the systems. Different length delays between different devices in a wireless communications system may result in scheduling conflicts and/or colliding signals in the system.

SUMMARY

The described techniques relate to improved methods, systems, devices, and apparatuses that support sidelink timing control. Generally, the described techniques provide for improved communication reliability, scheduling conflict management, or both for sidelink communications. As described herein, sidelink communications may refer to any communications between a first user equipment (UE) and a second UE in a wireless communications system, such as device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs. Sidelink reception may be delayed with respect to sidelink transmission based on a path and/or distance traveled by a sidelink message. In some cases, this delay may result in scheduling conflicts, such as a sidelink reception resource at a UE partially or fully overlapping in time with a downlink reception resource (or any other access link communication resource) at the UE.

To resolve scheduling conflicts that arise due to sidelink delays, UEs, base stations, or both may implement sidelink timing control. In a first example, a base station may statically or dynamically (e.g., based on a UE request) configure a timing gap between a sidelink communication resource and a subsequent access link communication resource in a resource schedule. This timing gap may operate as a buffer between delayed sidelink reception resources and the start of access link communication resources. In a second example, a first UE may transmit a timing request (e.g., a timing adjustment request) to indicate an updated sidelink transmission timing adjustment value for a second UE. The first UE may send the timing request directly to the second UE or may send the request to the second UE via a base station. A base station receiving a timing adjustment request may relay the timing adjustment request as is to the second UE or may determine a timing adjustment command to transmit to the second UE based on the timing adjustment request. The second UE receiving a timing adjustment request may determine a timing adjustment value for sidelink transmissions to the first UE based on the request. For example, the second UE may switch to using the indicated timing adjustment value, may continue to use a same timing adjustment value, or may select any other supported timing adjustment value based on the received timing adjustment request. If the second UE modifies the sidelink transmission timing adjustment value for sidelink transmissions to the first UE, the first UE may receive the sidelink transmissions in resources that avoid (or reduce) scheduling conflicts and/or collisions with other communications.

DETAILED DESCRIPTION

Figure 1:
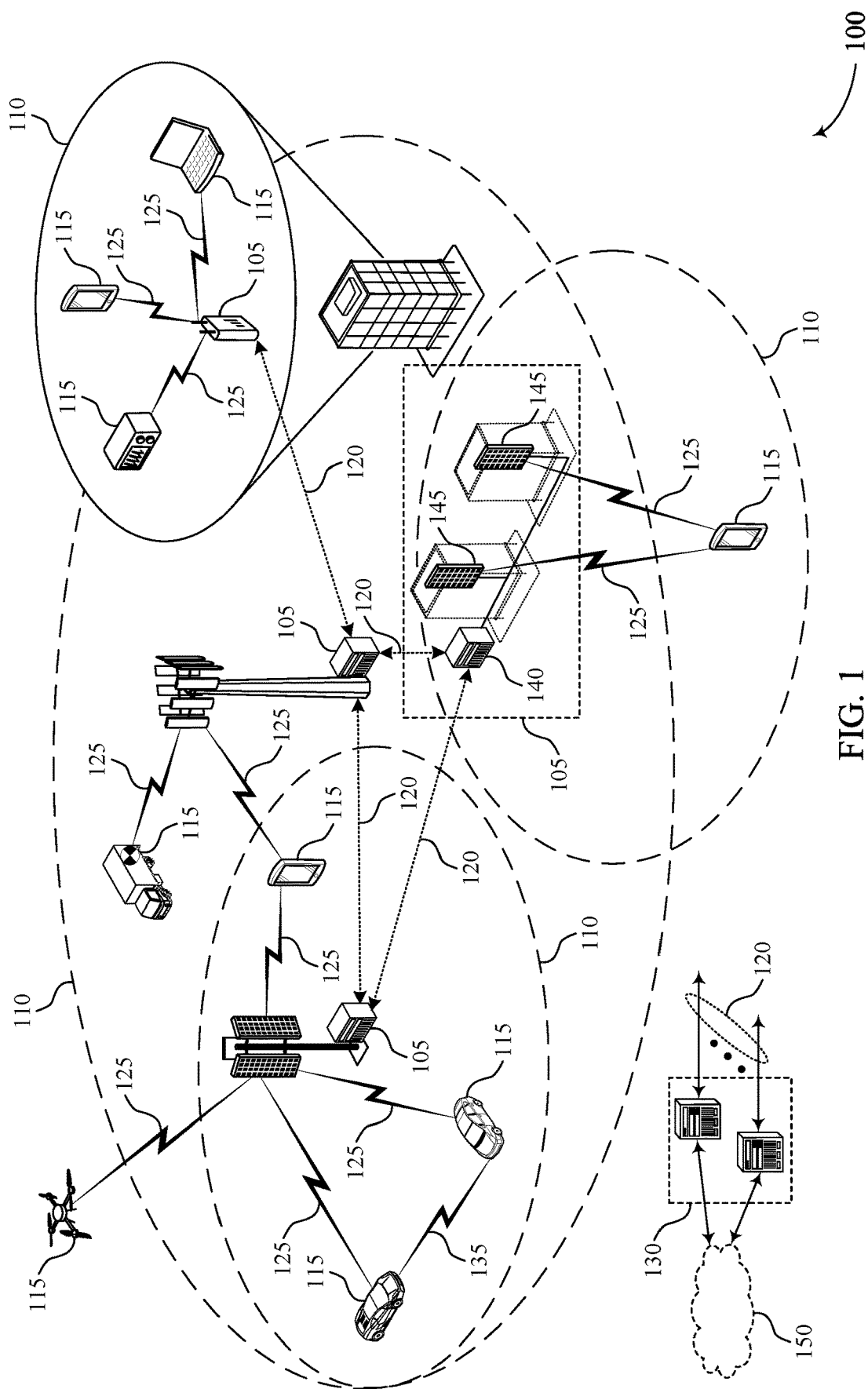
FIGS. 1, 2, 3A, and 3B illustrate examples of wireless communications systems that support sidelink timing control in accordance with aspects of the present disclosure.

A wireless communications system may support both access links and sidelinks for communications between wireless devices. An access link may refer to any communication link between a user equipment (UE) and a base station. For example, an access link may support uplink signaling, downlink signaling, connection procedures, etc. A sidelink may refer to any communication link between UEs. For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs. In some wireless communications systems, both access link and sidelink communications may experience time delays due to signal propagation in the systems. The length of a delay in time (e.g., from when a transmitting device starts sending a signal to when a receiving device starts receiving the signal) may be based on a path of the signal, a distance traveled by the signal, or both. Different length delays between different devices in a wireless communications system may result in scheduling conflicts and/or collisions in the system.

To avoid or reduce resource conflicts (e.g., UEs receiving sidelink transmissions in resources overlapping with resources for downlink reception, sidelink reception from other UEs, uplink transmission, etc.), UEs, base stations, or both may implement sidelink timing control. In a first implementation, a base station may configure a time interval gap between a sidelink communication resource and a subsequent access link communication resource. In some cases, the base station may statically implement the time interval gap at the end of any set of sidelink communication resources. In other cases, the base station may dynamically determine to implement the time interval gap based on a request received from one or more UEs. The time interval gap may operate as a buffer between delayed sidelink reception resources and the start of access link communication resources. In some examples, the length of the time interval gap may be based on a cell size of the base station. For example, the length of the time interval gap may be based on a maximum sidelink reception delay for UEs operating in the cell.

In a second implementation, a UE may determine to transmit a timing request for a specific sidelink. For example, the UE may receive a transmission from a second UE over a sidelink in a sidelink reception resource and may identify an overlap (e.g., a partial overlap, a full overlap, etc.) in time between the sidelink reception resource and another communication resource for the UE. The UE may transmit the timing request (e.g., a timing adjustment request) to a base station or the second UE. If transmitted to the base station, the base station may relay the timing request to the second UE or determine a timing adjustment command (e.g., based on a centralized function, mapping, table, etc.) to send to the second UE based on the request (and, in some cases, other requests from other UEs). The second UE may receive a timing adjustment request or a timing adjustment command and may update the sidelink transmission timing adjustment value for the sidelink with the UE. For example, if receiving a timing adjustment command, the second UE may set the timing adjustment value to a value indicated in the command. However, if receiving a timing adjustment request, the second UE may determine whether to maintain a same timing adjustment value, update to the indicated timing adjustment value, or select another timing adjustment value based on additional parameters (e.g., other timing adjustments, transmission priority values, etc.). If the second UE modifies the sidelink transmission timing adjustment value for sidelink transmissions to the UE, the UE may receive the sidelink transmissions in resources that avoid (or reduce) scheduling conflicts and/or collisions with other communications. Sidelink timing control may reduce signaling overhead in a system, as the UE may reduce the frequency of requesting retransmissions for messages unsuccessfully received due to reception resource overlaps.

Aspects of the disclosure are initially described in the context of wireless communications systems. Additional aspects are described with reference to scheduling configurations and process flows. Aspects of the disclosure are further illustrated by and described with reference to apparatus diagrams, system diagrams, and flowcharts that relate to sidelink timing control.

FIG. 1 illustrates an example of a wireless communications system 100 that supports sidelink timing control in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit of the wireless communications system 100 and may be referred to as a transmission time interval (TTI). In some cases, the TTI duration (that is, the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a D2D communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, V2V communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying certain amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communications systems 100, UEs 115 and/or base stations 105 may implement sidelink timing control (e.g., in addition to access link timing control). UEs 115 scheduled by a base station 105 may implement access link timing control, as the base station 105 indicates a "fixed" communication schedule (e.g., where scheduled resources and any changes to the schedule are indicated) to the UEs 115, and the UEs 115 can derive their access link timing according to the fixed schedule. However, sidelink transmission timing may be determined independently by UEs 115, which may result in scheduling conflicts between sidelink reception and other communications. To resolve or reduce such conflicts, UEs 115 and/or base stations 105 may implement sidelink timing control.

In a first example, a base station 105 may statically or dynamically (e.g., based on a request from a UE 115) configure a timing gap between a sidelink communication resource and a subsequent access link communication resource in a resource schedule. In a second example, a first UE 115 may transmit a timing request (e.g., a timing adjustment request) to indicate an updated sidelink transmission timing adjustment value for a second UE 115. The first UE 115 may send the timing request directly to the second UE 115 or may send the request to the second UE 115 via a base station 105. A base station 105 receiving a timing adjustment request may relay the timing adjustment request as is to the second UE 115 or may determine a timing adjustment command to transmit to the second UE 115 based on the timing adjustment request. The second UE 115 receiving the timing adjustment request may determine a timing adjustment value for sidelink transmissions to the first UE 115 based on the request. For example, the second UE 115 may switch to using the indicated timing adjustment value, may continue to use a same timing adjustment value, or may select any other supported timing adjustment value based on the received timing adjustment request. The timing adjustment request may support coordination between UEs 115 such that the UEs 115 may operate according to mutually beneficial sidelink transmission timings.

Figure 2:
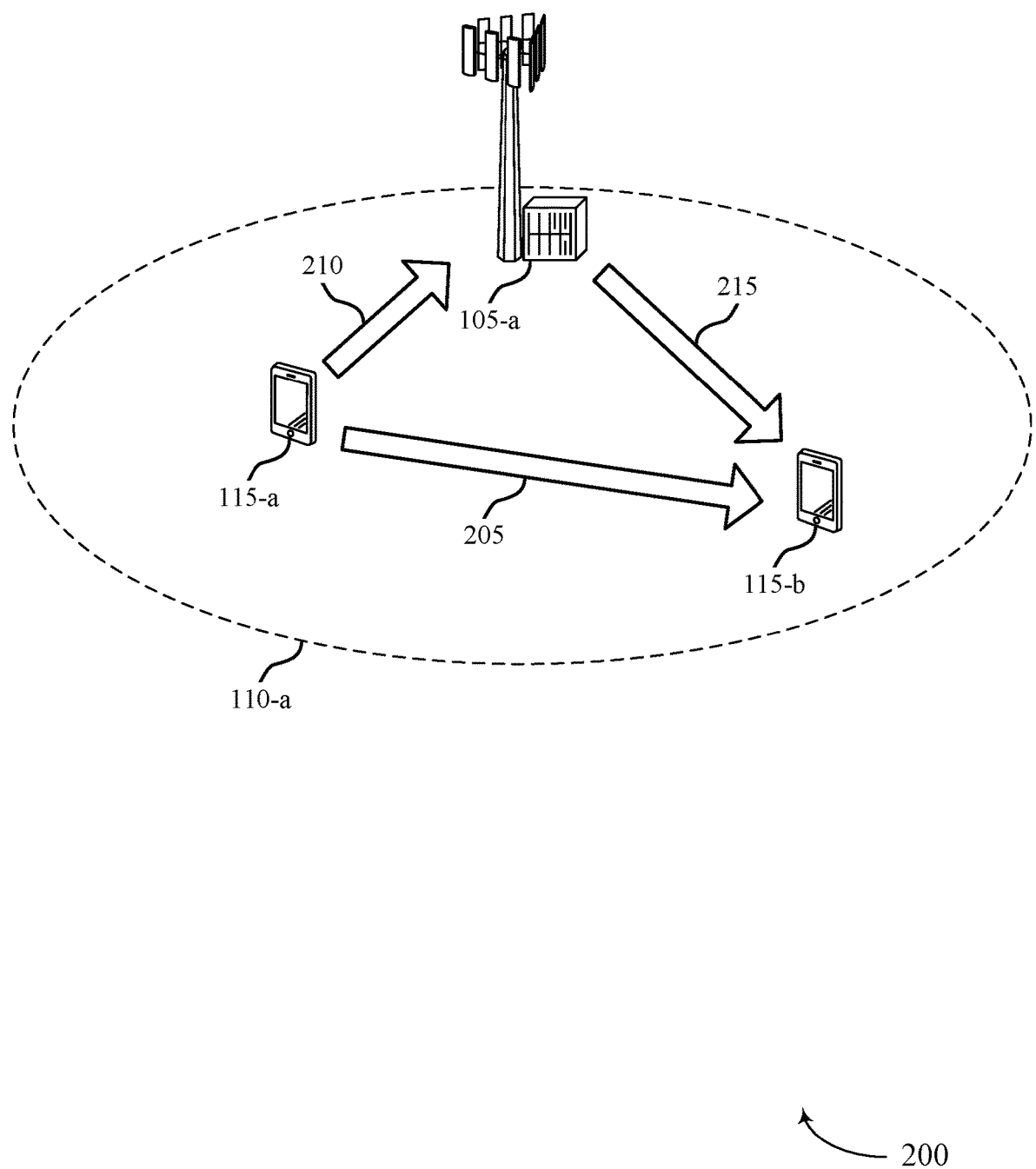

FIG. 2 illustrates an example of a wireless communications system 200 that supports sidelink timing control in accordance with aspects of the present disclosure. The wireless communications system 200 may include base station 105-a and UEs 115-a and 115-b, which may be examples of a base station 105 and UEs 115 as described with reference to FIG. 1. Base station 105-a may serve a geographic coverage area 110-a. In some cases, base station 105-a, UEs 115, or both may implement sidelink timing control. For example, base station 105-a may implement timing gaps between scheduled sidelink resources and access link resources. Additionally or alternatively, the wireless devices, such as UE 115-a, UE 115-b, base station 105-a, or some combination of these devices may implement a timing adjustment request, a timing adjustment command (e.g., a timing advance command), or a combination thereof.

Base station 105-a may serve multiple UEs 115 in a cell (e.g., geographic coverage area 110-a). Within the cell, the UEs 115 may be of varying distances from one another and each UE 115 may be of varying distance from the base station 105-a. In some cases, UE 115-a may be closer to base station 105-a than UE 115-b. In some cases, the distance between UE 115-a and UE 115-b may be different from the distance between either UE 115 or base station 105-a. These variable distances may result in different wave propagation times between devices, such that there may be variable delays between when a signal is transmitted and when the signal is received (e.g., depending on the devices transmitting and receiving the signal).

A base station 105 (e.g., base station 105-a) may have fixed transmission and reception timing. A UE 115 may derive its access link reception timing from a downlink received signal. Due to variations in distances, UE 115-a may receive a downlink transmission from base station 105-a at a first time and UE 115-b may receive the same downlink transmission from base station 105-b at some time later compared to the time UE 115-a received the downlink transmission. Similarly, the delay in time for base station 105-a to receive an uplink transmission from UE 115-b may be greater than the delay in time for base station 105-a to receive an uplink transmission from UE 115-a. The amount of time that a UE 115 is delayed in receiving a downlink transmission from the base station 105 plus the amount of time the base station 105 is delayed in receiving an uplink transmission from the UE 115 may be referred to as the round-trip delay.

In some cases, a UE 115 may apply a timing adjustment (e.g., a timing advance) to overcome round-trip delay for an access link. A timing advance may be indicated to the UE 115 via a timing advance command. For example, the base station 105 may estimate the timing advance for the UE 115 by measuring uplink signals (e.g., random access channel (RACH) signals) received from the UE 115. The timing advance may measure a negative offset between the start of a downlink reception resource (e.g., subframe) and the start of an uplink transmission resource (e.g., subframe). In some cases, the timing advance may be two times the signal propagation delay on the access link. The UE 115 may shift resources used for uplink transmission in time. In some cases, the shift may be such that an uplink transmission of the UE 115 arrives at the base station 105 in the uplink reception resources fixed at the base station 105. Timing adjustments may be applied to support orthogonal frequency division multiple access (OFDMA) in the system, such that uplink signals from multiple different UEs 115 arrive at the base station 105 synchronously (e.g., in the fixed uplink reception resources).

In some cases, UE 115-a and UE 115-b may communicate with one another via one or more sidelinks (e.g., in addition to communicating with base station 105-a via access links). However, in one example, sidelink and access link communication resources may overlap in time when base station 105-a and UEs 115-a and 115-b are of similar distance from one another. In another example, sidelink communications may experience a greater round-trip delay than access link communications if the distance between UE 115-a and UE 115-b is greater than the distance between either UE 115 or the base station 105. This greater round-trip delay may cause overlapping in sidelink and access link time resources (e.g., reception resources). Wireless devices may implement sidelink timing control to reduce or remove symbol overlap between sidelink and access link resources. Additionally or alternatively, sidelink timing control may be implemented to support OFDMA operation, such that sidelink signals from different UEs 115 may arrive at an intended UE 115 synchronously.

In some cases, the timing of each direction of a sidelink may be independently controlled. For example, UE 115-b may transmit sidelink signals to UE 115-a according to a sidelink transmission timing adjustment value selected by UE 115-b (e.g., independent of coordination with UE 115-a). UE 115-a may determine that the sidelink signals from UE 115-b may overlap with other downlink transmissions from base station 105-a (or any other scheduled communications at UE 115-a). For example, based on the different propagation delays at UE 115-a for signals from UE 115-b and base station 105-a, signals transmitted in non-overlapping transmission resources by UE 115-b and base station 105-a may be received at UE 115-a in partially or fully overlapping reception resources. To mitigate this overlap, UE 115-a may transmit a signal 205 to UE 115-b that includes a timing adjustment request. In some cases, a timing adjustment request may be transmitted in a radio resource control (RRC) message, a medium access control (MAC) control element (CE), physical (PHY) layer signaling, a timing advance command (e.g., with a sidelink identifier), or some combination of these or other signals and/or messages. The timing adjustment request may request UE 115-b to modify the sidelink transmission timing adjustment for transmitting to UE 115-a over the sidelink. This timing adjustment may refer to an advance or delay of transmission timing (e.g., for a number of samples) relative to a current or default transmission timing (e.g., for a transmitter of UE 115-b). UE 115-b may determine whether adjusting its sidelink transmission timing will impact any of UE 115-b's future transmissions or receptions. In some cases, UE 115-b may determine whether or not to shift its sidelink transmission timing according to the timing adjustment request based on other timing parameters (e.g., to avoid overlapping time resources with other communications).

Additionally or alternatively, UE 115-a may transmit a signal 210 to base station 105-a including a timing adjustment request. Base station 105-a may transmit a signal 215 to UE 115-b that may include a timing adjustment request or a timing adjustment command. For example, base station 105-a may relay the timing adjustment request from UE 115-a to UE 115-b, or base station 105-a may determine a timing adjustment command to transmit to UE 115-b based on the timing adjustment request from UE 115-a. UE 115-b may implement the timing shift indicated in the timing adjustment command. In some cases, both UEs 115-a and 115-b may transmit a timing adjustment request to base station 105-a. The base station 105-a may consider both requests and transmit timing adjustment commands to one or both of UEs 115-a and 115-b based on the set of timing adjustment requests. Additionally or alternatively, UE 115-a may transmit a signal to base station 105-a requesting base station 105-*a* to include a timing interval gaps (e.g., an additional gap) between sidelink resources and access link resources in the time domain. Implementing sidelink timing control through timing adjustment requests, timing adjustment commands, or timing gaps between sidelink and access link resources may reduce timing resource overlaps between sidelink and access link communications.

Figure 3A:
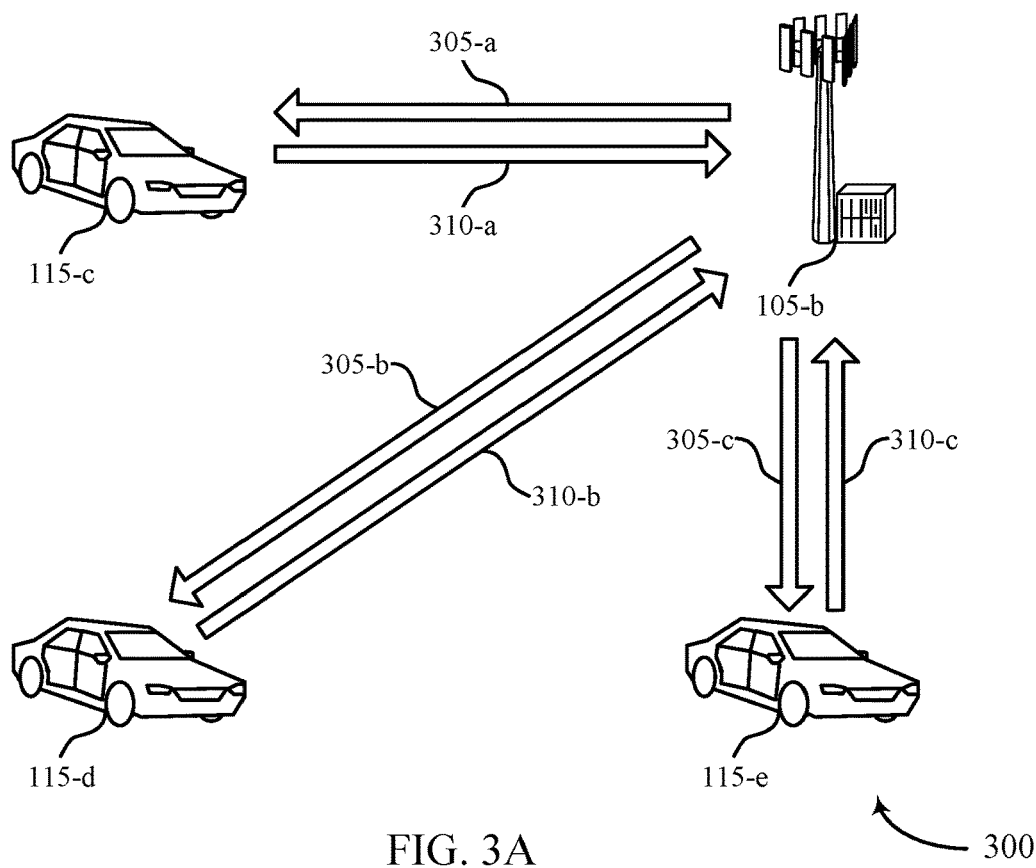

FIG. 3A illustrates an example of a wireless communications system 300 that supports sidelink timing control in accordance with aspects of the present disclosure. The wireless communications system 300 may include base station 105-*b* and UEs 115-*c*, 115-*d*, and 115-*e*, which may be examples of a base station 105 and UEs 115 as described with reference to FIGS. 1 and 2. In some cases, base station 105-*b*, UEs 115, or both may implement sidelink timing control. For example, base station 105-*b* may implement timing gaps between scheduled sidelink resources and subsequent access link resources. Additionally or alternatively, wireless devices, such as UE 115-*c*, UE 115-*d*, UE 115-*e*, base station 105-*b*, or some combination of these may implement a timing adjustment request, a timing adjustment command, or a combination thereof. For example, base station 105-*b* may coordinate sidelink timing adjustments in a centralized manner.

UEs 115-*c*, 115-*d*, and 115-*e* may communicate with base station 105-*b*. Additionally, the UEs 115 may communicate with other UEs 115 via sidelink. In some examples, UE 115-*c* may determine there is an unfavorable path loss between UE 115-*c* and base station 105-*b* and UE 115-*c* may determine to utilize a nearby UE 115 as a relay between UE 115-*c* and base station 105-*b*. In some other examples, UE 115-*c* may periodically or aperiodically perform discovery procedures to identify nearby UEs 115 (e.g., within some threshold distance or signal range) for D2D communications. UEs 115 may transmit signals that may include discovery signals, and a UE 115 that receives a discovery signal may determine whether there will be a scheduling conflict between sidelink time resources and access link time resources (e.g., based on the reception timing for the discovery signal). In such cases, the determination of symbol overlaps may occur prior or concurrent to establishing a sidelink channel. In other cases, the determination of reception overlap may occur during sidelink communications. For example, reception overlap may occur based on changes to a sidelink channel (e.g., due to UEs 115 moving within the system).

In one example, UE 115-*c* may communicate with UE 115-*d* via sidelink and UE 115-*d* may communicate with UE 115-*e* via sidelink. In a centralized implementation, UE 115-*c* may determine that there may be an overlap in time resources (e.g., between sidelink reception and downlink reception, between sidelink reception from different UEs 115, etc.) and may transmit a signal 310-*a* including a timing adjustment request to base station 105-*b*. The timing adjustment request may include one or more of a timing adjustment value, a link identifier, one or more UE identifiers, etc. In another example, multiple UEs 115-*c*, 115-*d*, and 115-*e* may determine scheduling conflicts and may transmit signals 310-*a*, 310-*b*, and 310-*c* respectively to base station 105-*b*, where the signaling includes timing adjustment requests for the different UEs 115. In some examples, a single UE 115, such as UE 115-*c*, may transmit multiple timing adjustment requests (e.g., a first timing adjustment request for a sidelink with UE 115-*d* and a second timing adjustment request for a sidelink with UE 115-*e*).

Base station 105-*b* may receive the timing adjustment requests from one or more UEs 115. In one implementation, base station 105-*b* may relay a timing adjustment request to an indicated UE 115 in a transmission 305 (e.g., indicated by a UE or sidelink identifier). The timing adjustment request may indicate a timing adjustment value that the receiving UE 115 may or may not implement. Alternatively, base station 105-*b* may transmit a timing adjustment command (e.g., a timing advance command) that indicates a timing adjustment value for the receiving UE 115 to implement. If the timing adjustment command is a timing advance command, the timing advance command may further include an indication of the link type to adjust (e.g., a sidelink or an access link), the timing shift, a link identifier, or some combination of these parameters.

In some cases, using a centralized procedure, base station 105-*b* may consider multiple (e.g., all) timing adjustment requests for UEs 115. Base station 105-*b* may utilize a centralized algorithm (e.g., a function, a lookup table, etc.) to determine sidelink timing adjustment requests or commands based on the received timing adjustment requests. In one example, the centralized algorithm may minimize the total number of UEs 115 for base station 105-*b* to send timing adjustment commands. In some examples, the centralized algorithm may not determine a favorable solution. In some of these examples, base station 105-*b* may modify a communication schedule to include a timing gap between sidelink communication resources and subsequent access link resources (e.g., to reduce or remove an overlap between corresponding sidelink reception resources and the access link resources). Base station 105-*b* may transmit a signal 305-*a*, 305-*b*, and 305-*c* to UEs 115-*c*, 115-*d*, and 115-*e* respectively that may indicate the updated communication schedule including the additional gap(s).

Figure 3B:
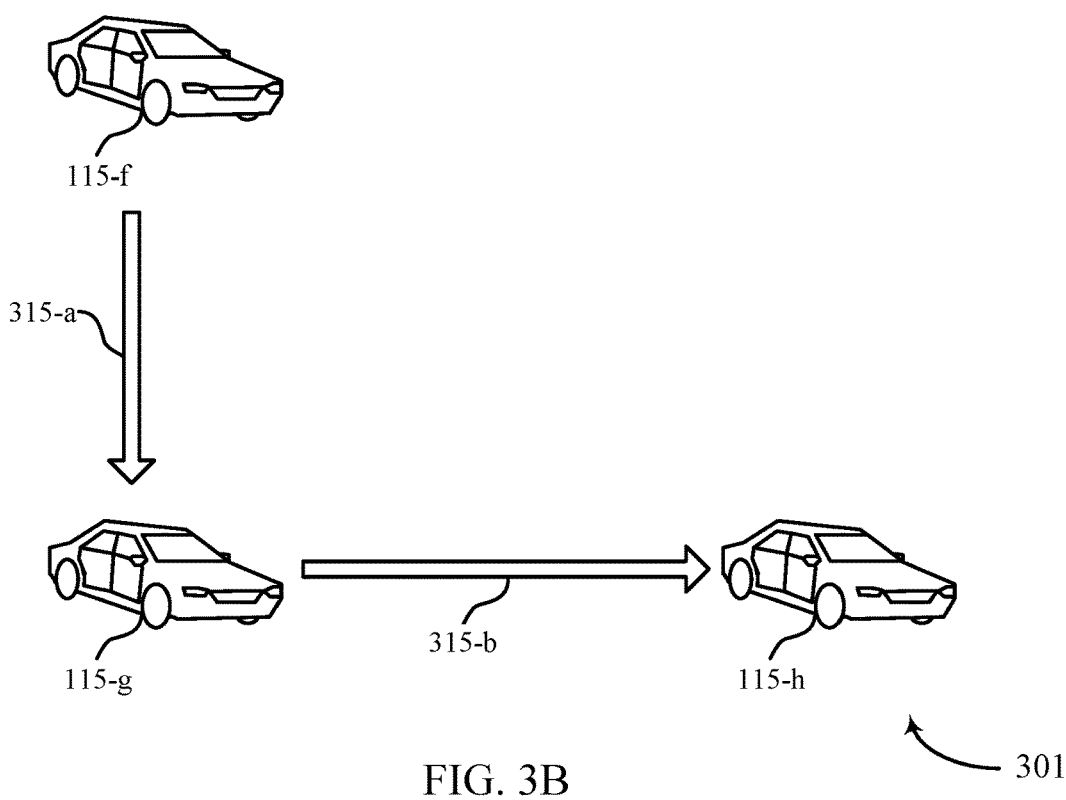

FIG. 3B illustrates an example of a wireless communications system 301 that supports sidelink timing control in accordance with aspects of the present disclosure. The wireless communications system 301 may include UEs 115-*f*, 115-*g*, and 115-*h*, which may be examples of UEs 115 as described with reference to FIGS. 1, 2, and 3A. In some cases, UEs 115 may implement sidelink timing control. For example, UEs 115-*f*, 115-*g*, 115-*h*, or some combination of these UEs 115 may implement timing adjustment requests in a de-centralized manner.

UEs 115 may communicate with other UEs 115 via sidelinks. For example, UE 115-*f* may communicate with UE 115-*g* via sidelinks, and UE 115-*g* may also communicate with UE 115-*h* via sidelinks. A receiving UE 115 (e.g., UE 115-*f*) may identify at least a partial overlap in time of sidelink reception resources with other communication resources. In some examples, UE 115-*f* may transmit a timing adjustment request to UE 115-*g* via a sidelink 315-*a*. In one specific example, UE 115-*g* may determine that the sidelink transmission timing adjustment value indicated by the timing adjustment request is compatible with other timing and/or scheduling information at UE 115-*g*. In this example, UE 115-*g* may implement the requested sidelink transmission timing adjustment value for sidelink transmissions to UE 115-*f*. In another example, UE 115-*g* may implement a sidelink transmission timing adjustment value different from the requested sidelink transmission timing adjustment value (e.g., based on other timing information, communication prioritization, etc.).

In some other examples, UE 115-*g* may determine that modifying the sidelink transmission timing according to the timing adjustment request would cause an overlap with other sidelink and/or access link communications at UE 115-*g* (e.g., sidelink reception from UE 115-*h*). In some cases, UE 115-*g* may relay the timing adjustment request from UE 115-*f* via sidelink 315-*b* to UE 115-*h*. Additionally or alternatively, UE 115-*g* may transmit its own timing adjustment request to UE 115-*h* via sidelink 315-*b*. UE 115-*h* may determine whether to implement a sidelink timing adjustment based on the relayed timing adjustment request originating from UE 115-*f*, the timing adjustment request from UE 115-*g*, or a combination thereof.

In some implementations, UE 115-*f* may also communicate with UE 115-*h*. In these cases, UE 115-*f* may identify at least a partial overlap in time of sidelink reception resources from UE 115-*h* with other communication resources. In some of these cases, UE 115-*f* may transmit a timing adjustment request to each one of UE 115-*g*, UE 115-*h*, a base station 105 (not shown), or a combination thereof. In some implementations, UEs 115-*f*, 115-*g*, and 115-*h* may store timing adjustment values for multiple UEs 115. For example, UE 115-*g* may store respective sidelink transmission timing adjustment values for UE 115-*f* and UE 115-*h*. The transmission timing adjustment values may be stored in a lookup table in memory, where the values may correspond to different UE 115 identifiers. UE 115-*g* may determine to transmit a sidelink message to a particular UE 115 (e.g., UE 115-*h*) and may retrieve the corresponding sidelink transmission timing adjustment value from memory based on a UE identifier or a sidelink identifier.

Additionally or alternatively, a UE 115 may store a multicast sidelink transmission timing adjustment value to use for multicast sidelink transmissions. A UE 115 may transmit a multicast sidelink transmission to UEs 115 that are within a signaling range and are monitoring for the multicast transmission. In one example, the multicast sidelink transmission timing adjustment value may be the same as a sidelink transmission timing adjustment value for one of the UEs 115 (e.g., the greatest sidelink transmission timing adjustment value for a unicast transmission to a UE 115). In another example, the multicast sidelink transmission timing adjustment value may be a different value determined based on all of the sidelink transmission timing adjustment values for the UEs 115 (e.g., larger than all individual sidelink transmission timing adjustment values, an average of the sidelink transmission timing adjustment values, etc.).

Figure 4:
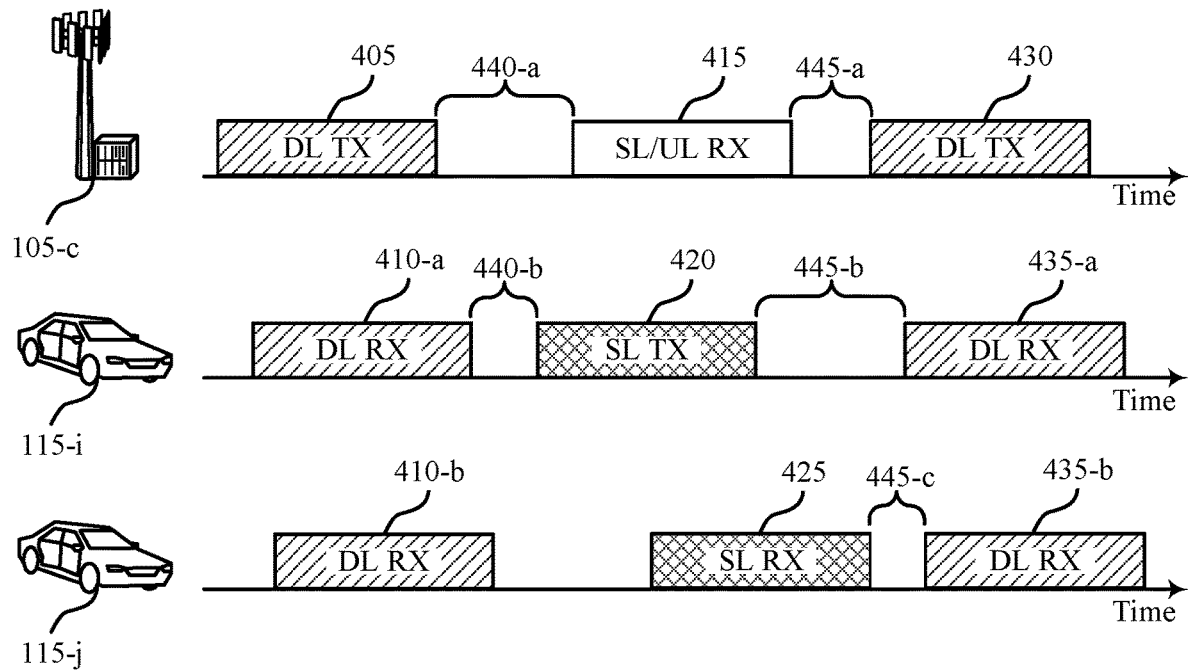
FIGS. 4, 5A, and 5B illustrate examples of time domain resource scheduling that support sidelink timing control in accordance with aspects of the present disclosure.

FIG. 4 illustrates an example of time domain resource scheduling 400 that supports sidelink timing control in accordance with aspects of the present disclosure. The time domain resource scheduling 400 may include base station 105-*c* and UEs 115-*i* and 115-*j*, which may be examples of a base station 105 and UEs 115 as described with reference to FIGS. 1, 2, 3A, and 3B. In some cases, base station 105-*c*, UEs 115, or a combination of these devices may implement sidelink timing control. For example, base station 105-*c* may implement timing gaps between scheduled sidelink resources and access link resources.

Base station 105-*c* may be configured to operate according to a fixed timing schedule (e.g., base station 105-*c* may transmit and receive signals according to fixed frame and/or subframe boundaries). In such a schedule, base station 105-*c* may configure access link symbol durations 402. UEs 115 (e.g., UEs 115-*i* and 115-*j*) may derive downlink reception timing from a downlink received signal. For example, the downlink reception timing may not be fixed, as the downlink reception timing may vary based on the propagation delay for a signal. Additionally, in some cases, UEs 115 may communicate with other UEs 115 via sidelink channels. Base station 105-*c* may allocate resources (e.g., uplink reception resources at base station 105-*c*) for sidelink communications 403 by the UEs 115. The resources (e.g., symbols, slots, sub-slots, subframes, TTIs, etc.) allocated for sidelink communication, such as the reserved sidelink and/or uplink reception timing resource 415, may configure when UE 115-*i* may transmit a sidelink transmission (e.g., in sidelink transmission resource 420). UE 115-*j* may receive the sidelink transmission in sidelink reception resource 425, where the timing of the sidelink reception resource 425 may depend on when UE 115-*i* transmits the sidelink transmission and the signaling delay due to wave propagation between UE 115-*i* and UE 115-*j*.

As described herein, due to varying distances of UEs 115 from the base station 105-*c*, there may be a difference in timing between when base station 105-*c* transmits a downlink transmission (e.g., downlink transmission resource 405) and when UEs 115-*i* and 115-*j* receive the downlink transmission (e.g., downlink reception resources 410-*a* and 410-*b*, respectively). In some examples, UE 115-*i* may be geographically closer to base station 105-*c* than UE 115-*j*. In some cases, UE 115-*j* may be at or near the edge of the serving cell for base station 105-*c*, while UE 115-*i* may be closer to the center of the serving cell. In such cases, UE 115-*i* may receive a downlink transmission from serving base station 105-*c* earlier than UE 115-*j* receives the same downlink transmission. This difference may be caused by wave propagation between the base station 105 and the UEs 115, where a larger distance traveled by a signal corresponds to a greater reception delay experienced by a UE 115. Other factors may affect the timing delay (e.g., obstructions, UE movement, etc.). A similar delay may also be experienced by base station 105-*c* when the UEs 115-*i* and 115-*j* transmit uplink signals. The delay experienced at a UE 115 and a base station 105 may be referred to as a round-trip delay.

Based on base station 105-*c* operating on a fixed communication schedule, base station 105-*c* may receive uplink transmissions from UEs 115-*i* and 115-*j* synchronously despite the different delays. For example, the UEs 115 may adjust their uplink transmission timings to account for the different delays. In some cases, timing gaps may accommodate for the adjusted timings to handle the round-trip delays experienced in a cell. Accordingly, base station 105-*c* may configure one or more gaps in the resource schedule (e.g., between downlink transmission resource 405 and uplink reception resource 415) to allow for a UE 115-*j* at or near the cell edge to receive a downlink transmission and transmit an uplink transmission without the time adjusted resources for downlink reception and uplink transmission overlapping.

For example, in the case of UEs 115 transmitting uplink transmissions to base station 105-*c*, gap 440-*a* between downlink transmission resource 405 and uplink reception resource 415 may be pre-configured. The timing gap experienced by base station 105-*c* may span a different length of time than the gaps experienced by UEs 115-*i* and 115-*j* (e.g., depending on the distance of each UE 115 from the base station 105). In some cases, UE 115-*i* may experience a smaller gap (e.g., gap 440-*b*) between downlink reception resource 410-*a* and an uplink transmission resource (not shown) than the gap 440-*a*. Due to the longer amount of time needed for the downlink transmission to reach UE 115-*j*, if UE 115-*j* is at or near the cell edge, UE 115-*j* may experience no gap or a minimal gap between downlink reception resource 410-*b* and an uplink transmission resource (not shown). To transmit signals that reach base station 105-*c* synchronously (e.g., concurrently) in uplink reception resource 415, UE 115-*j* may transmit an uplink transmission earlier than UE 115-*i* in the time domain.

As illustrated in FIG. 4, the uplink reception resource 415 may additionally or alternatively be allocated for sidelink communications. For example, base station 105-*c* may reserve a sidelink communication resource 415 in which UE 115-*i* and UE 115-*j* may communicate via sidelinks. In one example, UE 115-*i* may transmit a sidelink transmission in a sidelink transmission resource 420 to UE 115-*j*. The sidelink transmission resource 420 may partially or fully precede the sidelink communication resource 415 in time (e.g., based on a sidelink transmission timing adjustment value for the sidelink from UE 115-*i* to UE 115-*j*). In some cases, base station 105-*c* may not configure gap 445-*a* between sidelink communication resource 415 and downlink transmission resource 430. In these cases, gap 445-*b* and gap 445-*c* may be reduced or non-existent. In some examples, the lack of gap 445-*a* may cause overlap between sidelink reception resource 425 and downlink reception resource 435-*b* at UE 115-*j* (e.g., even if there is a timing gap 445-*b* between the sidelink transmission resource 420 and the downlink reception resource 435-*a*). Such an overlap may reduce reception reliability at UE 115-*j*, as a sidelink transmission and a downlink transmission may collide during reception at UE 115-*j*.

In some case, upon determining a potential symbol overlap (e.g., between sidelink reception resource 425 and downlink reception resource 435-*b*), UE 115-*j* may transmit a timing request to base station 105-*c*. In some implementations, the timing request may include or be an example of a gap scheduling request. The timing request may request base station 105-*c* to add a timing gap (or an additional gap) when switching from reserved sidelink communication resource 415 to access link resources (e.g., downlink transmission resource 430). Base station 105-*c* may configure and implement gap 445-*a* in response to the request. In this way, gap 445-*a* may be dynamically configured by base station 105-*c* upon reception of one or more timing requests from UE 115-*i*, UE 115-*j*, or both. In another implementation, gap 445-*a* may be statically configured by base station 105-*c*. The addition of gap 445-*a* may reduce or avoid communication resource overlapping. The length of the timing gap 445-*a* may be based on a size of the cell served by base station 105-*c*. For example, a larger cell may use a longer gap 445-*a* to account for longer reception delays in the cell (e.g., due to a greater potential distance traveled by the signals).

Figure 5A:
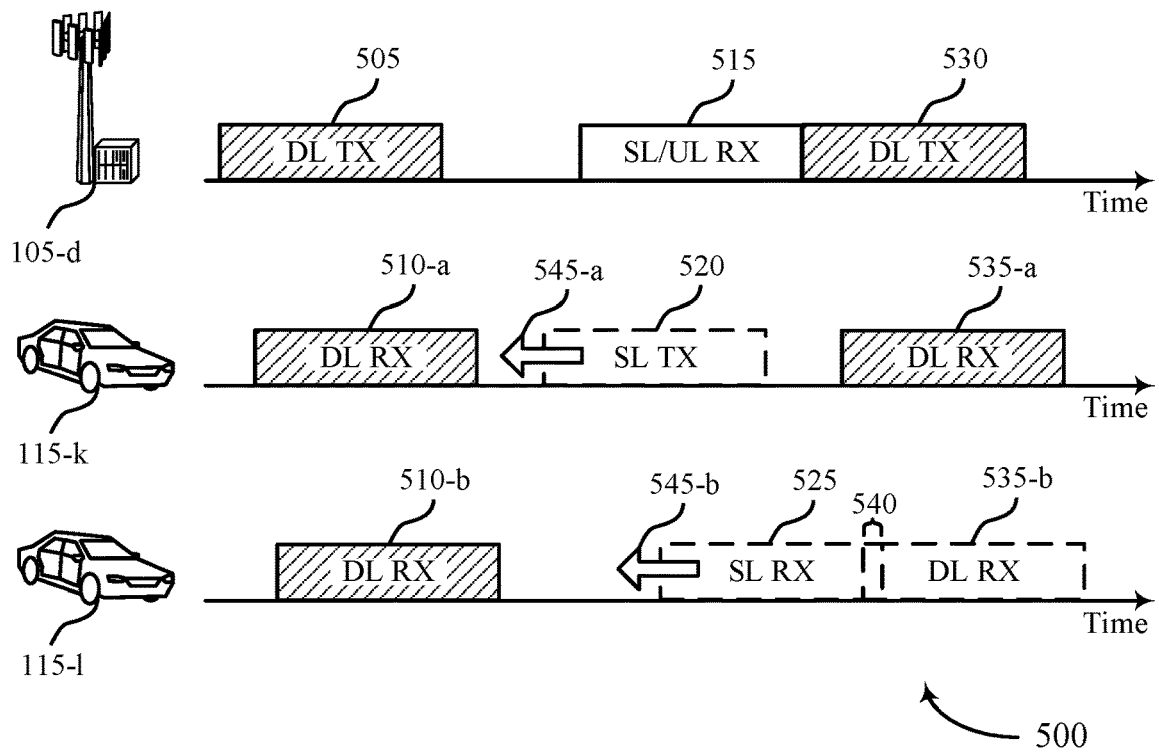

FIG. 5A illustrates an example of time domain resource scheduling 500 that supports sidelink timing control in accordance with aspects of the present disclosure. The time domain resource scheduling 500 may include base station 105-*d* and UEs 115-*k* and 115-*l*, which may be examples of a base station 105 and UEs 115 as described with reference to FIGS. 1, 2, 3A, 3B, and 4. In some cases, base station 105-*d*, UEs 115, or both may implement sidelink timing control. For example, UE 115-*l*—directly or via base station 105-*d*—may implement a timing adjustment request, a timing adjustment command, or a combination thereof.

Base station 105-*d* may transmit a downlink transmission in downlink transmission resource 505 and may transmit another downlink transmission in downlink transmission resource 530 at a later time during time resources reserved for access link communications 502. UEs 115-*k* and 115-*l* may receive the first downlink transmission from base station 105-*d* in downlink reception resources 510-*a* and 510-*b*, respectively. At a later time, UEs 115-*k* and 115-*l* may receive the second downlink transmission in downlink reception resources 535-*a* and 535-*b*, respectively.

As described with reference to FIG. 4, UE 115-*k* and UE 115-*l* may communicate via sidelinks. UE 115-*k* may transmit a sidelink transmission in a sidelink transmission resource 520 to UE 115-*l* during time resources reserved for sidelink communications 503. Base station 105-*d* may reserve a time resource (e.g., a symbol, a set of symbols, a TTI, etc.) as a sidelink communications and/or uplink reception resource 515. Using this resource 515, UEs 115 may communicate with other UEs 115 via sidelinks. In some cases, UE 115-*k* may determine a timing adjustment value for a sidelink transmission to UE 115-*l* independent of the reception delay for this sidelink channel. In such cases, if there is a significant delay over the sidelink channel, UE 115-*l* may experience an overlap 540 between sidelink reception resource 525 and downlink reception resource 535-*b*. For example, if UE 115-*k* transmits the sidelink transmission in sidelink transmission resource 520 (e.g., based on a sidelink transmission timing adjustment value and the sidelink communication resource 515), UE 115-*l* may experience a scheduling conflict between the sidelink transmission and the second downlink transmission.

Prior to or based on an overlap 540 occurring, UE 115-*l* may identify the overlap 540 and determine to transmit a timing adjustment request to UE 115-*k*, base station 105-*d*, or a combination thereof. The timing adjustment request may request an updated sidelink transmission timing adjustment value for the sidelink between UE 115-*k* and UE 115-*l* (e.g., a value greater than the current sidelink transmission timing adjustment value resulting in the overlap 540). The timing adjustment request may include the link type requesting to be shifted, a link identifier, a total sidelink transmission timing adjustment value, an additional sidelink transmission timing adjustment value, or some combination thereof. In one example, the timing adjustment request may indicate that sidelink transmission resource 520 be updated according to shift 545-*a* (e.g., with respect to the sidelink communication resource 515), which may result in a similar or identical shift 545-*b* to the sidelink reception resource 525.

Figure 5B:
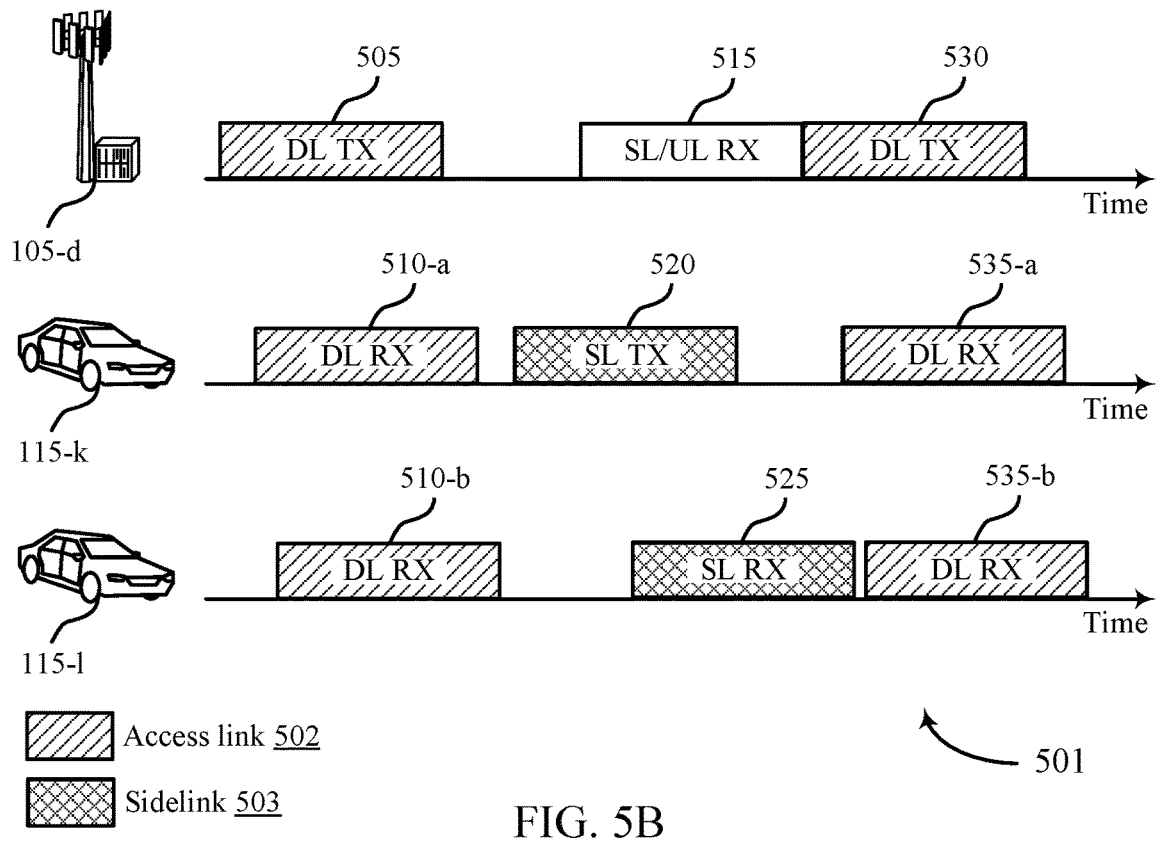

FIG. 5B illustrates an example of time domain resource scheduling 501 that supports sidelink timing control in accordance with aspects of the present disclosure. The time domain resource scheduling 501 may include base station 105-*d* and UEs 115-*k* and 115-*l*, which may be examples of a base station 105 and UEs 115 as described with reference to FIGS. 1, 2, 3A, 3B, 4, and 5A. In some cases, base station 105-*d* and/or UEs 115 may implement sidelink timing control. For example, UE 115-*l* may implement a timing adjustment request, a timing adjustment command, or a combination thereof.

As described with reference to FIG. 5A, base station 105-*d* may transmit a downlink transmission in downlink transmission resource 505 and may transmit another downlink transmission in downlink transmission resource 530 at a later time during time resources reserved for access link communications 502. UEs 115-*k* and 115-*l* may receive the first downlink transmission from base station 105-*d* in downlink reception resources 510-*a* and 510-*b*, respectively. At a later time, UEs 115-*k* and 115-*l* may receive the second downlink transmission in downlink reception resources 535-*a* and 535-*b*, respectively. Base station 105-*d* may additionally reserve a sidelink communication and/or uplink reception resource 515. During this resource 515, base station 105-*d* may receive uplink transmissions from one or more UEs 115, or UEs 115 may communicate with one another via sidelink channels, or a combination thereof.

As described with reference to FIG. 5A, UE 115-*l* may transmit a timing adjustment request to UE 115-*k*, or base station 105-*d*, or a combination thereof. In some cases, UE 115-*k* may implement a timing shift for sidelink transmission resource 520, for example, either based on a timing adjustment request received from UE 115-*l* or based on a timing adjustment command from base station 105-*d*. Due to UE 115-*k* shifting its sidelink transmission resource 520 per the timing adjustment request/command, UE 115-*l* may experience a similar shift in its sidelink reception resource 525. Accordingly, UE 115-*l* may avoid or reduce an overlap between the corresponding sidelink reception resource 525 and a downlink reception resource 535-*b*. Avoiding this overlap may allow UE 115-*l* to successfully receive (or more reliably receive) both the sidelink transmission in the sidelink reception resource 525 and the downlink transmission in the downlink reception resource 535-*b*. By improving the reception reliability at UE 115-*l*, the sidelink timing control may reduce signaling overhead in the system, as UE 115-*l* may reduce the frequency of requesting retransmissions for messages unsuccessfully received due to reception resource overlaps.

Figure 6:
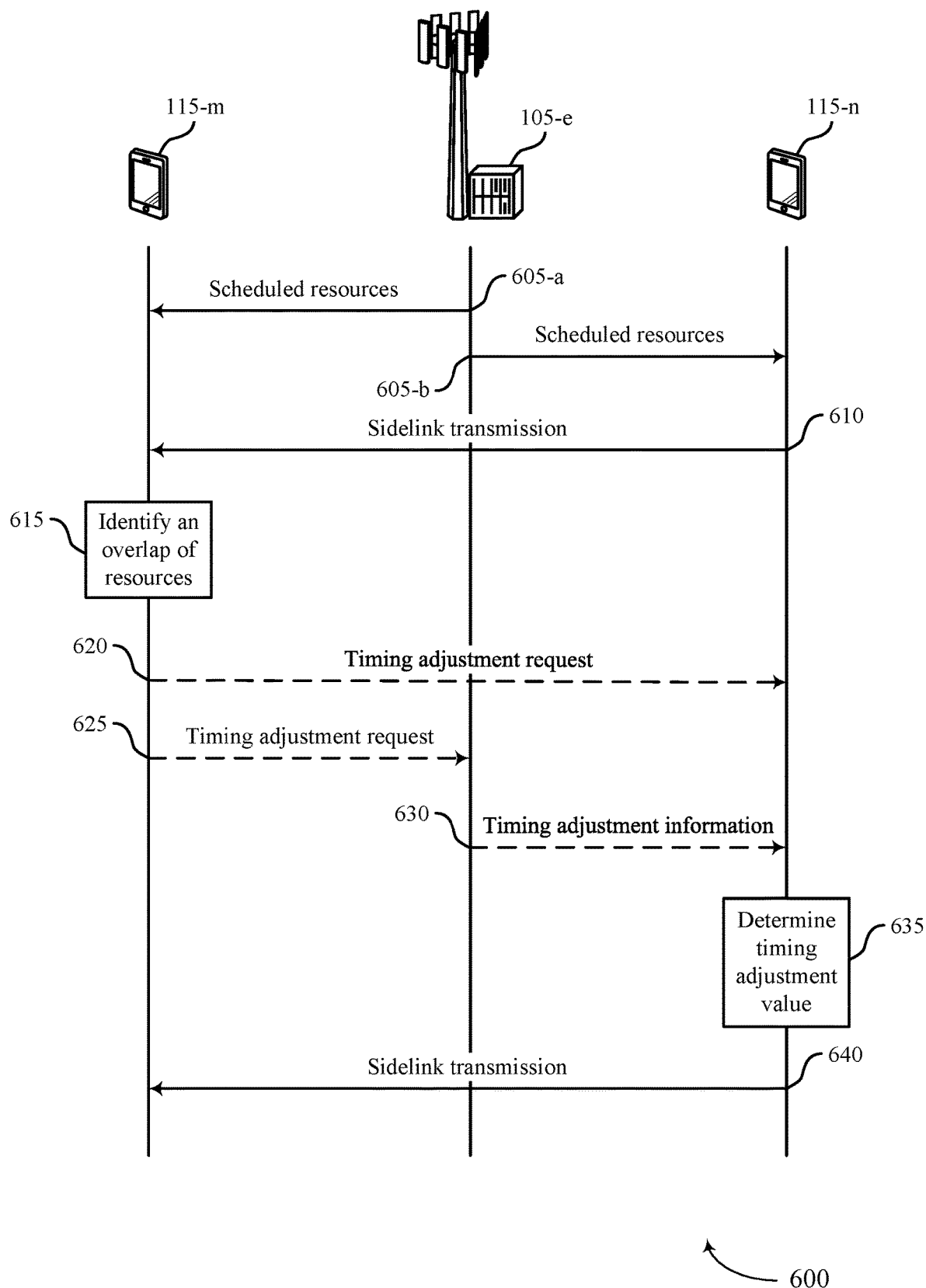
FIGS. 6 and 7 illustrate examples of process flows that support sidelink timing control in accordance with aspects of the present disclosure.

FIG. 6 illustrates an example of a process flow 600 that supports sidelink timing control in accordance with aspects of the present disclosure. The process flow 600 may illustrate an example sidelink timing control procedure based on timing adjustment signaling. In some cases, base station 105-*e*, UE 115-*m*, UE 115-*n*, or a combination thereof may implement sidelink timing control. For example, UE 115-*m* may implement a timing adjustment request. Base station 105-*e* and UEs 115-*m* and 115-*n* may be examples of the corresponding wireless devices described with reference to FIGS. 1 through 5. Alternative examples of the following may be implemented, where some steps are performed in a different order than described or are not performed at all. In some cases, steps may include additional features not mentioned below, or further steps may be added.

At 605-*a* and 605-*b*, base station 105-*e* may schedule one or more UEs (e.g., UEs 115-*m* and 115-*n*) with one or more sidelink communication resources and one or more access link communication resources. In some implementations, UE 115-*m* may be closer to or farther away from base station 105-*e* than UE 115-*n*. Additionally or alternatively, the distance between UE 115-*m* and UE 115-*n* may be different than or similar to the distance from either UE 115 to base station 105-*e*. At 610, UE 115-*n* may transmit, to UE 115-*m* and via a sidelink between UE 115-*n* and UE 115-*m*, a transmission based on a sidelink transmission timing adjustment value for the sidelink channel. In some cases, UE 115-*n* selects the sidelink transmission timing adjustment value independent of UE 115-*m*.

At 615, UE 115-*m* may identify at least a partial overlap of timing resources between the sidelink reception resource and a communication resource for UE 115-*m* different from the sidelink reception resource (e.g., another sidelink reception resource, a downlink reception resource, an uplink transmission resource, a sidelink transmission resource, etc.). In some implementations, the detection of an overlap in timing resources may occur during connection establishment with UE 115-*n*. In other implementations, the detection of an overlap in timing resources may occur within a time duration while communicating with UE 115-*n*.

In a first implementation, at 620, UE 115-*m* may transmit a timing adjustment request to UE 115-*n* based on identifying at least the partial overlap of timing resources. The timing adjustment request may indicate the link identifier for the sidelink on which UE 115-*m* detects overlap. Additionally or alternatively, the timing adjustment request may include a timing adjustment value different from a timing adjustment value currently used by UE 115-*n* (e.g., for the sidelink transmission at 610).

In a second implementation, at 625, UE 115-*m* may transmit a timing adjustment request for sidelink transmissions to base station 105-*e*. Base station 105-*e* may receive the timing adjustment request for sidelink transmissions from UE 115-*n* to UE 115-*m*. At 630, base station 105-*e* may transmit timing adjustment information to UE 115-*n* for the sidelink transmissions from UE 115-*n* to UE 115-*m* based on the timing adjustment request. Timing adjustment information may include the timing adjustment request (e.g., relayed by base station 105-*e*) or a timing adjustment command determined by base station 105-*e* (e.g., based on the timing adjustment request and any additional timing adjustment request from other UEs 115).

At 635, UE 115-*n* may receive timing adjustment information (e.g., a timing adjustment request and/or a timing adjustment command) and may determine a timing adjustment value. If receiving a timing adjustment request, UE 115-*n* may determine whether to implement the timing adjustment request. If receiving a timing adjustment command, UE 115-*n* may implement the timing adjustment command. At 640, UE 115-*n* may transmit, via the sidelink between the UE 115-*n* and UE 115-*m*, a second transmission using the determined sidelink transmission timing adjustment value. This may be the same as the value used at 610 or may be different (e.g., an indicated value or a value determined based on some algorithm at UE 115-*n*).

Figure 7:
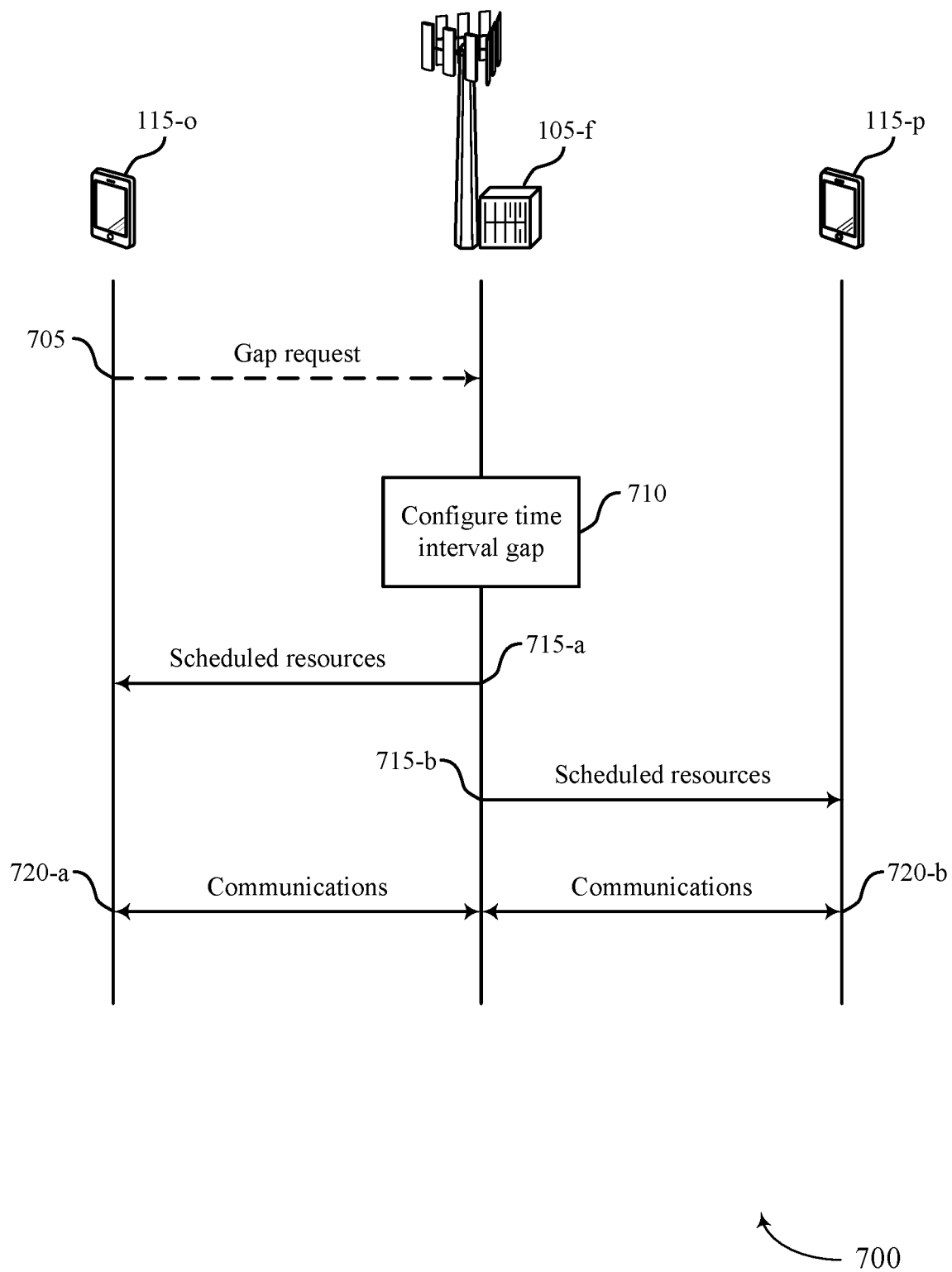

FIG. 7 illustrates an example of a process flow 700 that supports sidelink timing control in accordance with aspects of the present disclosure. The process flow 700 may illustrate an example sidelink timing control procedure based on a gap configuration. For example, base station 105-*f* may implement a timing gap between scheduled sidelink resources and subsequent access link resources (e.g., without any other communication resources scheduled between the sidelink resources and the access link resources). The configured gap may reduce or remove sidelink and access link resource overlap. Base station 105-*f* and UEs 115-*o* and 115-*p* may be examples of the corresponding wireless devices described with reference to FIGS. 1 through 5. Alternative examples of the following may be implemented, where some steps are performed in a different order than described or are not performed at all. In some cases, steps may include additional features not mentioned below, or further steps may be added.

In some cases, UE 115-*p* may transmit, via a sidelink between UE 115-*p* and UE 115-*o*, a transmission based on a sidelink transmission timing adjustment value. UE 115-*o* may identify at least a partial overlap of timing resources between the sidelink reception resource and a communication resource for UE 115-*o* different from the sidelink reception resource. In some implementations, the detection of an overlap in timing resources may occur during connection establishment with UE 115-*p*. In other implementations, the detection of an overlap in timing resources may occur when operating on an established sidelink with UE 115-*p*.

In some implementations, at 705, UE 115-*o* may transmit a gap scheduling request to base station 105-*f*. The gap scheduling request may be a part of a timing adjustment request. The gap scheduling request may request base station 105-*f* to dynamically implement a timing gap between sidelink and access link time resources. In some implementations, base station 105-*f* may receive gap scheduling requests from one or more UEs 115 (e.g., UEs 115-*o* and 115-*p*).

At 710, base station 105-*f* may configure a time interval gap between a sidelink communication resource and a subsequent access link communication resource. In a first implementation, this configuration may be based on the gap request from UE 115-*o*, UE 115-*p*, or a combination thereof (e.g., in a dynamic implementation). In a second implementation, base station 105-*f* may automatically configure the gap (e.g., in a static implementation).

At 715-*a* and 715-*b*, base station 105-*f* may schedule the UEs (e.g., UEs 115-*o* and 115-*p*) with a set of sidelink communication resources and a set of access link communication resources based on the configured time interval gap (e.g., with the gap included as a buffer in time between sidelink and access link resources). At 720-*a* and 720-*b*, base station 105-*f* may communicate with the UEs (e.g., UEs 115-*o* and 115-*p*) using the set of access link communication resources and based on the configured time interval gap. Additionally or alternatively, UEs 115-*o* and 115-*p* may communicate with each other using the set of sidelink communication resources and based on the configured time interval gap.

Figure 8:
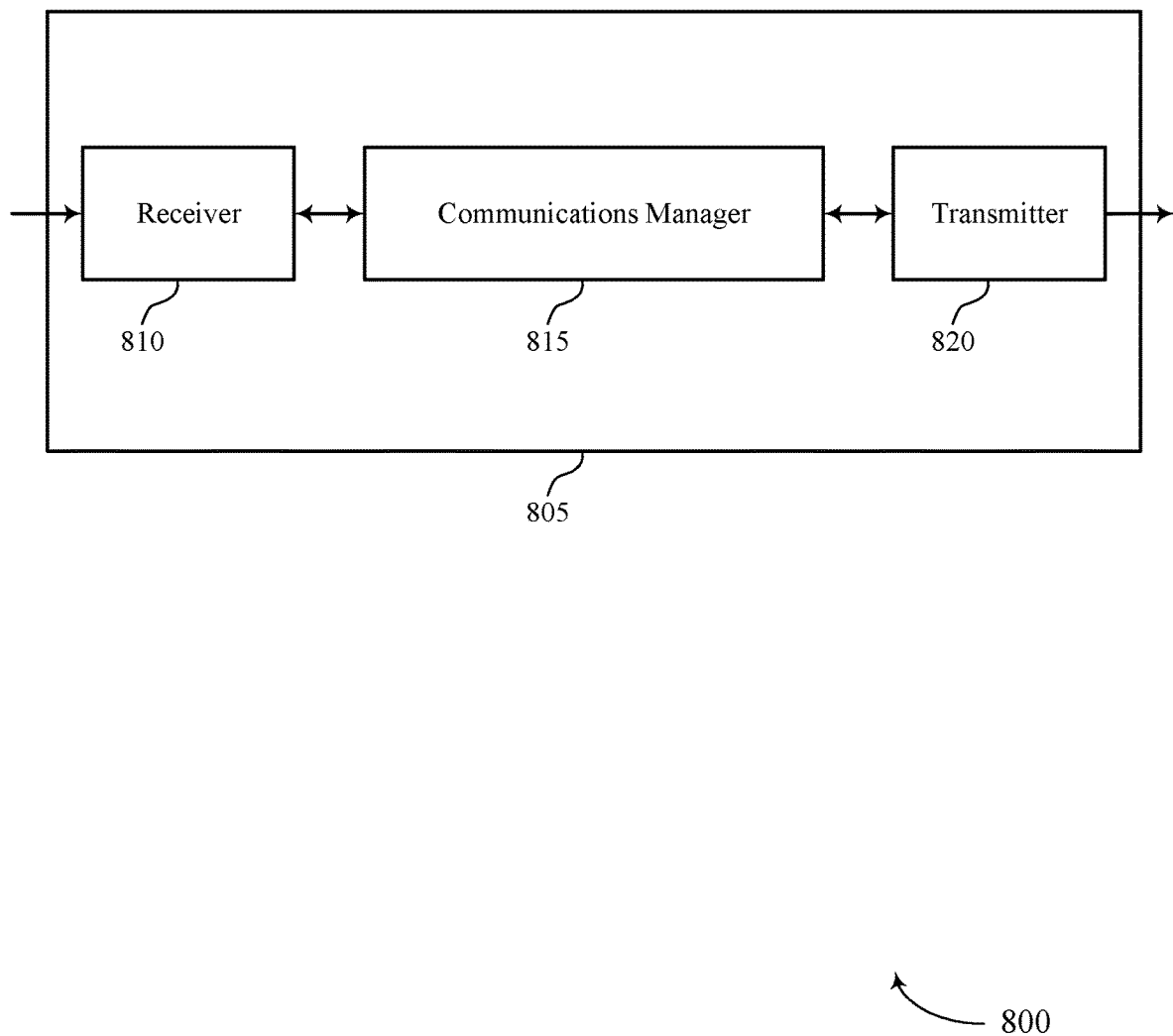
FIGS. 8 and 9 show block diagrams of devices that support sidelink timing control in accordance with aspects of the present disclosure.

FIG. 8 shows a block diagram 800 of a device 805 that supports sidelink timing control in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to sidelink timing control, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may be implemented at a first UE. In some cases, the communications manager 815 may receive, via a sidelink between the first UE and a second UE, a transmission from the second UE received in a sidelink reception resource for the first UE, identify at least a partial overlap of timing resources between the sidelink reception resource and a communication resource for the first UE different from the sidelink reception resource, and transmit a timing request based on identifying at least the partial overlap of timing resources. Additionally or alternatively, the communications manager 815 may transmit, via a sidelink between the first UE and a second UE, a first transmission based on a first sidelink transmission timing adjustment value, receive a timing adjustment request based on a sidelink reception resource for receiving the first transmission at the second UE, where the timing adjustment request indicates a second sidelink transmission timing adjustment value different from the first sidelink transmission timing adjustment value, determine a sidelink transmission timing adjustment value based on the timing adjustment request, and transmit, via the sidelink between the first UE and the second UE, a second transmission using the determined sidelink transmission timing adjustment value. The communications manager 815 may be an example of aspects of the communications manager 1110 described herein.

The actions performed by the communications manager 815 as described herein may be implemented to realize one or more potential advantages. For example, transmitting a timing request based on an overlap of timing resources may allow a UE 115 to coordinate sidelink transmission scheduling at another UE. This may improve the reception reliability at the UE 115, as the timing request can indicate a sidelink transmission timing adjustment value that reduces or avoids resource overlaps for future communications. Reducing or avoiding resource overlap may support improved reception at the UE 115, as multiple signals are not received in interfering resources in the time domain. Further, a UE 115 receiving the timing request may determine a sidelink transmission timing adjustment value based on the timing request that may be different than the indicated value. This determining supports flexible scheduling at the UE 115, allowing the UE 115 to prioritize critical communications and/or modify sidelink transmission scheduling to improve transmission reliability.

Based on transmitting a timing request, a processor of a first UE 115 (e.g., a processor controlling the receiver 810, the communications manager 815, the transmitter 820, etc.) may reduce processing resources used for sidelink reception. For example, transmitting the timing request to a second UE 115 may improve transmission reliability over the sidelink from the second UE 115 to the first UE 115 (e.g., by reducing or avoiding signal collisions at the first UE 115). As such, the first UE 115 may reduce the number of reception processes performed to successfully receive information over the sidelink (and, in some cases, over an access link). Reducing the number of reception processes may reduce a number of times the processor ramps up processing power and turns on processing units to handle sidelink message reception and decoding.

Additionally or alternatively, by determining a sidelink transmission timing adjustment value based on the timing adjustment request, a processor of the second UE 115 (e.g., a processor controlling the receiver 810, the communications manager 815, the transmitter 820, etc.) may reduce processing resources used for sidelink retransmission. For example, modifying the sidelink transmission timing adjustment value may improve transmission reliability to the first UE 115. As such, the second UE 115 may reduce the number of retransmissions used to successfully transmit the message on the sidelink to the first UE 115. Reducing the number of retransmissions may reduce a number of times the processor ramps up processing power and turns on processing units to handle sidelink message encoding and/or transmission. This reduced number of retransmissions may also reduce signaling overhead (e.g., in addition to reducing the processing overhead at the processor).

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
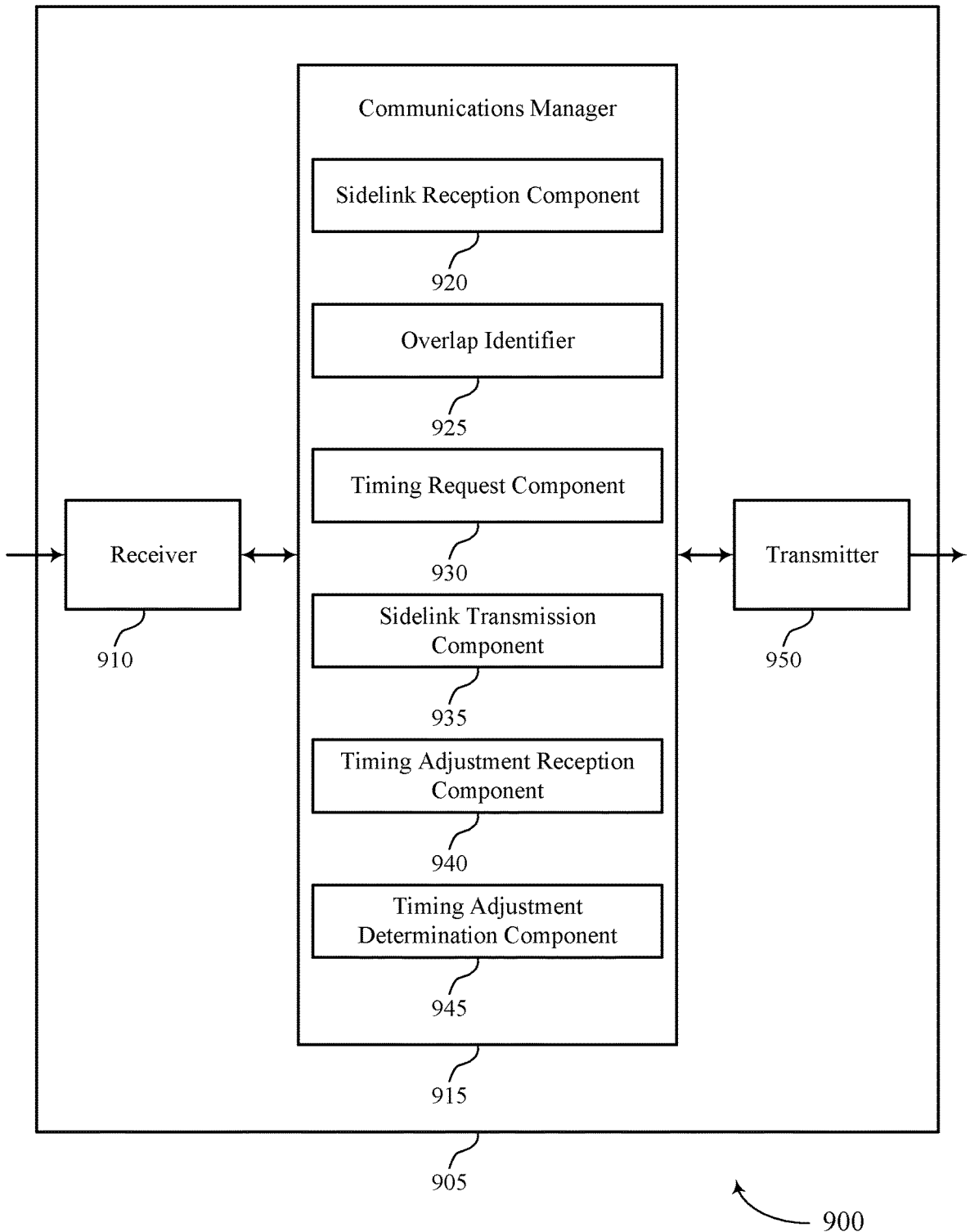

FIG. 9 shows a block diagram 900 of a device 905 that supports sidelink timing control in accordance with aspects of the present disclosure. The device 905 may be an example of aspects of a device 805, or a UE 115 as described herein. The device 905 may include a receiver 910, a communications manager 915, and a transmitter 950. The device 905 may also include a processor. Each of these components may be in communication with one another (e.g., via one or more buses).

The receiver 910 may receive information such as packets, user data, or control information associated with various information channels (e.g., control channels, data channels, and information related to sidelink timing control, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a sidelink reception component 920, an overlap identifier 925, a timing request component 930, a sidelink transmission component 935, a timing adjustment reception component 940, a timing adjustment determination component 945, or some combination of these components. The communications manager 915 may be an example of aspects of the communications manager 1110 described herein and may be implemented at a first UE.

The sidelink reception component 920 may receive, via a sidelink between the first UE and a second UE, a transmission from the second UE received in a sidelink reception resource for the first UE. The overlap identifier 925 may identify at least a partial overlap of timing resources between the sidelink reception resource and a communication resource for the first UE different from the sidelink reception resource. The timing request component 930 may transmit a timing request based on identifying at least the partial overlap of timing resources.

The sidelink transmission component 935 may transmit, via a sidelink between the first UE and a second UE, a first transmission based on a first sidelink transmission timing adjustment value. The timing adjustment reception component 940 may receive a timing adjustment request based on a sidelink reception resource for receiving the first transmission at the second UE, where the timing adjustment request indicates a second sidelink transmission timing adjustment value different from the first sidelink transmission timing adjustment value. The timing adjustment determination component 945 may determine a sidelink transmission timing adjustment value based on the timing adjustment request. The sidelink transmission component 935 may transmit, via the sidelink between the first UE and the second UE, a second transmission using the determined sidelink transmission timing adjustment value.

The transmitter 950 may transmit signals generated by other components of the device 905. In some examples, the transmitter 950 may be collocated with a receiver 910 in a transceiver module. For example, the transmitter 950 may be an example of aspects of the transceiver 1120 described with reference to FIG. 11. The transmitter 950 may utilize a single antenna or a set of antennas.

Figure 10:
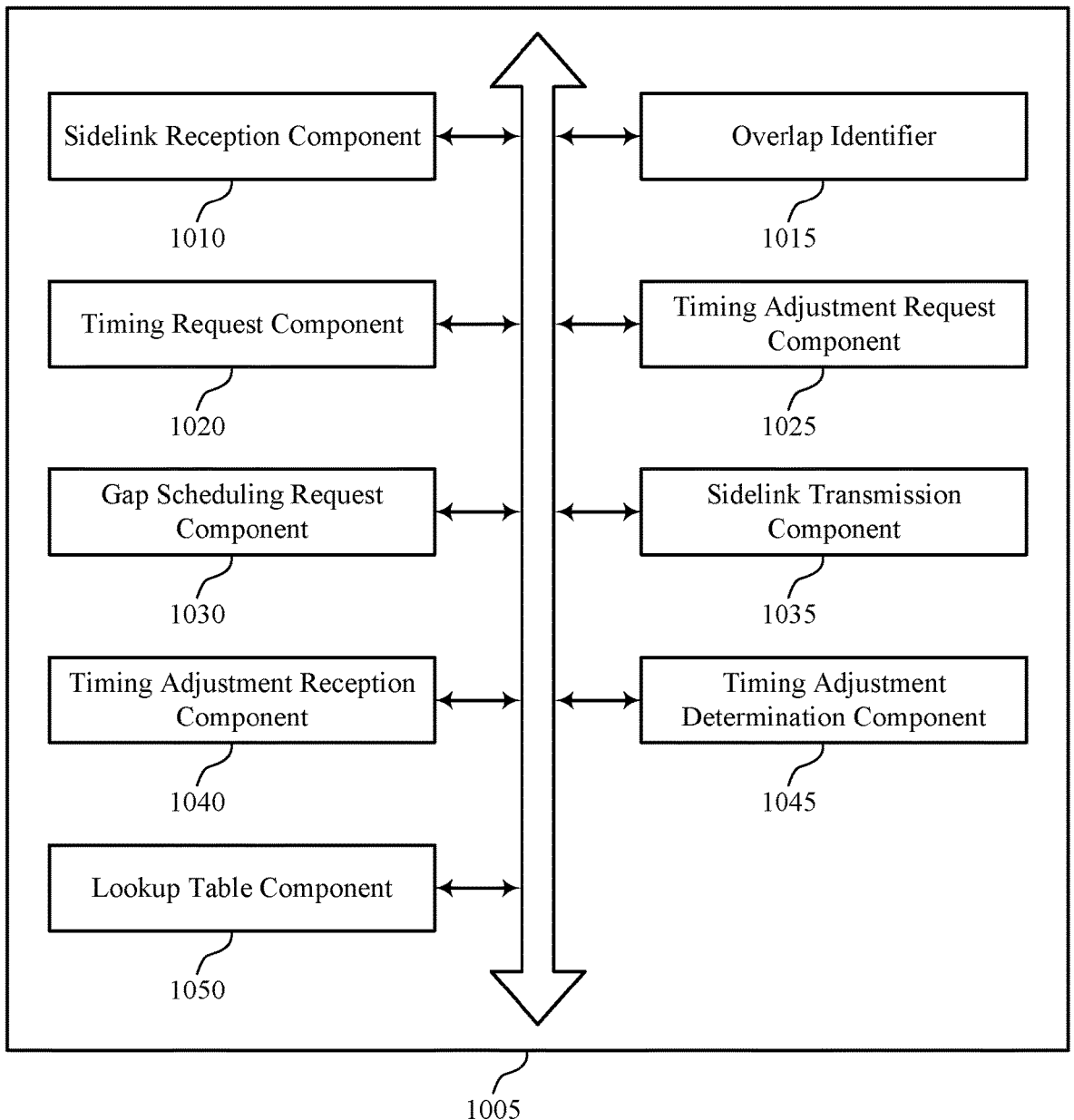
FIG. 10 shows a block diagram of a communications manager that supports sidelink timing control in accordance with aspects of the present disclosure.

FIG. 10 shows a block diagram 1000 of a communications manager 1005 that supports sidelink timing control in accordance with aspects of the present disclosure. The communications manager 1005 may be an example of aspects of a communications manager 815, a communications manager 915, or a communications manager 1110 described herein. The communications manager 1005 may include a sidelink reception component 1010, an overlap identifier 1015, a timing request component 1020, a timing adjustment request component 1025, a gap scheduling request component 1030, a sidelink transmission component 1035, a timing adjustment reception component 1040, a timing adjustment determination component 1045, a lookup table component 1050, or any combination of these components. Each of these modules may communicate, directly or indirectly, with one another (e.g., via one or more buses). The communications manager 1005 may be implemented at a first UE.

In a first implementation, the sidelink reception component 1010 may receive, via a sidelink between the first UE and a second UE, a transmission from the second UE received in a sidelink reception resource for the first UE. The overlap identifier 1015 may identify at least a partial overlap of timing resources between the sidelink reception resource and a communication resource for the first UE different from the sidelink reception resource. The timing request component 1020 may transmit a timing request based on identifying at least the partial overlap of timing resources.

In some examples, the timing request component 1020 may transmit an updated timing request based on a change to the sidelink between the first UE and the second UE. In some cases, the timing request is transmitted to one or both of a base station serving the first UE via an access link or the second UE via the sidelink. In some cases, the timing request is transmitted as a component of one or more of an RRC message, a MAC CE, PHY layer signaling, or a timing advance command.

The timing adjustment request component 1025 may generate the timing request, where the timing request includes a timing adjustment request for the second UE. In some cases, the transmission may be received in the sidelink reception resource based on a first sidelink transmission timing adjustment value for the second UE. In some of these cases, the timing adjustment request component 1025 may indicate a second sidelink transmission timing adjustment value different from the first sidelink transmission timing adjustment value in the timing adjustment request. In some cases, the second sidelink transmission timing adjustment value is greater than the first sidelink transmission timing adjustment value. In some cases, the first sidelink transmission timing adjustment value includes a first timing advance value, and the second sidelink transmission timing adjustment value includes a second timing advance value.

The gap scheduling request component 1030 may generate the timing request, where the timing request includes a gap scheduling request for a base station serving the first UE. In some examples, the gap scheduling request component 1030 may receive, from the base station and based on the gap scheduling request, an indication of a scheduled time interval gap between a sidelink communication resource and a subsequent access link communication resource. In some cases, a length of the scheduled time interval gap in a time domain is based on a cell size of the base station.

In a second implementation, the sidelink transmission component 1035 may transmit, via a sidelink between the first UE and a second UE, a first transmission based on a first sidelink transmission timing adjustment value. The timing adjustment reception component 1040 may receive a timing adjustment request based on a sidelink reception resource for receiving the first transmission at the second UE, where the timing adjustment request indicates a second sidelink transmission timing adjustment value different from the first sidelink transmission timing adjustment value. In some cases, the timing adjustment request is received from one or both of a base station serving the first UE via an access link or the second UE via the sidelink. In some cases, the timing adjustment request is a component of one or more of an RRC message, a MAC CE, PHY layer signaling, or a timing advance command.

The timing adjustment determination component 1045 may determine a sidelink transmission timing adjustment value based on the timing adjustment request. In some examples, determining the sidelink transmission timing adjustment value involves the timing adjustment determination component 1045 selecting the sidelink transmission timing adjustment value from a set of potential sidelink transmission timing adjustment values including one or more of the first sidelink transmission timing adjustment value, the second sidelink transmission timing adjustment value, or one or more additional sidelink transmission timing adjustment values different from both the first sidelink transmission timing adjustment value and the second sidelink transmission timing adjustment value. In some examples, the timing adjustment determination component 1045 may additionally select the first sidelink transmission timing adjustment value independent of the second UE.

The sidelink transmission component 1035 may transmit, via the sidelink between the first UE and the second UE, a second transmission using the determined sidelink transmission timing adjustment value.

In some examples, the sidelink transmission component 1035 may additionally transmit, via an additional sidelink between the first UE and a third UE, a third transmission based on a third sidelink transmission timing adjustment value different from the first sidelink transmission timing adjustment value and the second sidelink transmission timing adjustment value. The lookup table component 1050 may store both the determined sidelink transmission timing adjustment value for the sidelink between the first UE and the second UE and the third sidelink transmission timing adjustment value for the additional sidelink between the first UE and the third UE in a lookup table in memory, where the lookup table in memory includes a set of sidelink transmission timing adjustment values for a set of respective sidelinks between the first UE and a set of UEs.

In some examples, the timing adjustment reception component 1040 may receive an updated timing adjustment request based on a change to the sidelink between the first UE and the second UE, where the updated timing adjustment request indicates a third sidelink transmission timing adjustment value different from the second sidelink transmission timing adjustment value. In some examples, the timing adjustment determination component 1045 may determine an updated sidelink transmission timing adjustment value based on the updated timing adjustment request.

Figure 11:
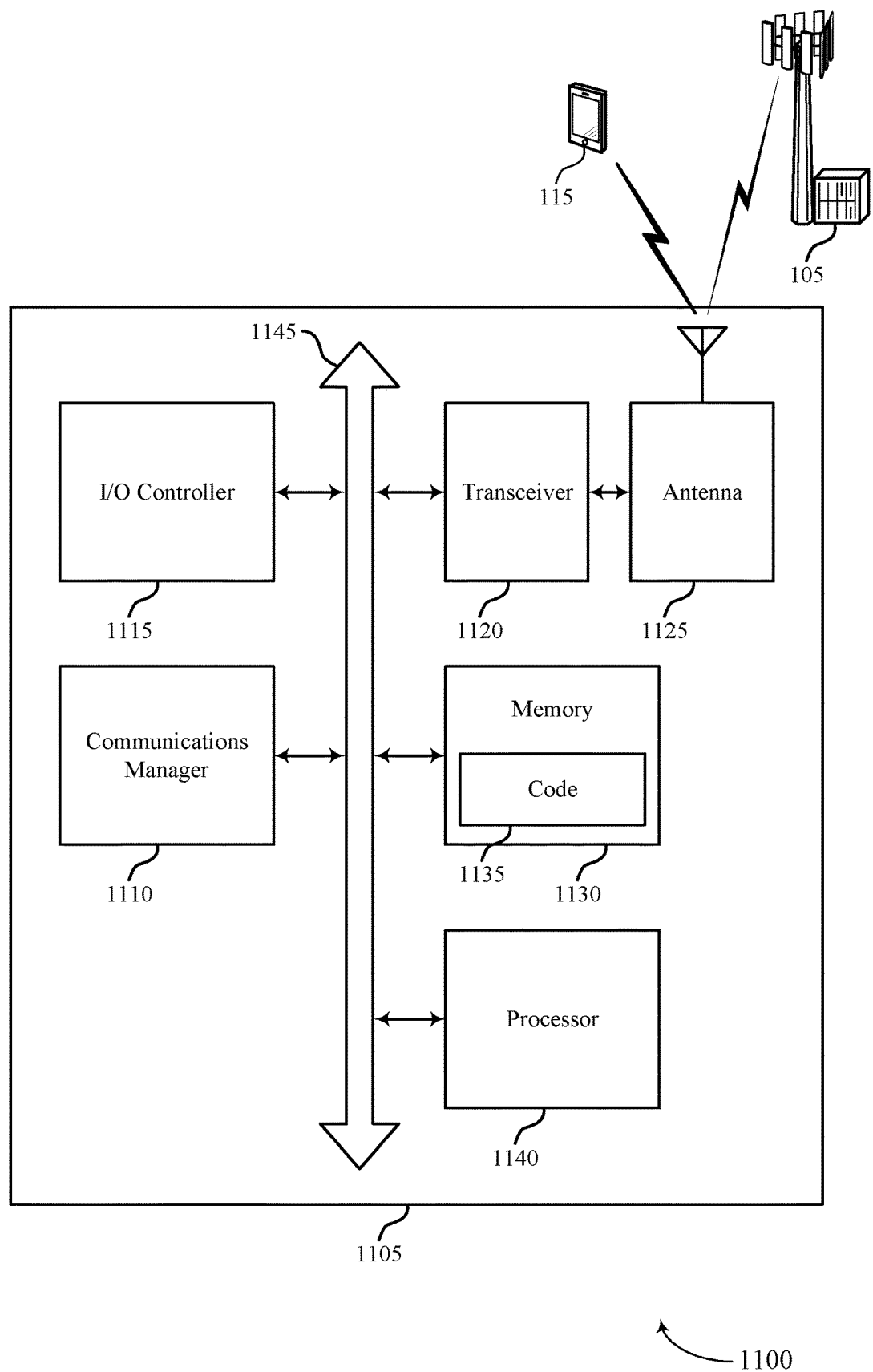
FIG. 11 shows a diagram of a system including a device that supports sidelink timing control in accordance with aspects of the present disclosure.

FIG. 11 shows a diagram of a system 1100 including a device 1105 that supports sidelink timing control in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may be implemented at a first UE. The communications manager 1110 may receive, via a sidelink between the first UE and a second UE, a transmission from the second UE received in a sidelink reception resource for the first UE, identify at least a partial overlap of timing resources between the sidelink reception resource and a communication resource for the first UE different from the sidelink reception resource, and transmit a timing request based on identifying at least the partial overlap of timing resources. Additionally or alternatively, the communications manager 1110 may transmit, via a sidelink between the first UE and a second UE, a first transmission based on a first sidelink transmission timing adjustment value, receive a timing adjustment request based on a sidelink reception resource for receiving the first transmission at the second UE, where the timing adjustment request indicates a second sidelink transmission timing adjustment value different from the first sidelink transmission timing adjustment value, determine a sidelink transmission timing adjustment value based on the timing adjustment request, and transmit, via the sidelink between the first UE and the second UE, a second transmission using the determined sidelink transmission timing adjustment value.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting sidelink timing control).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
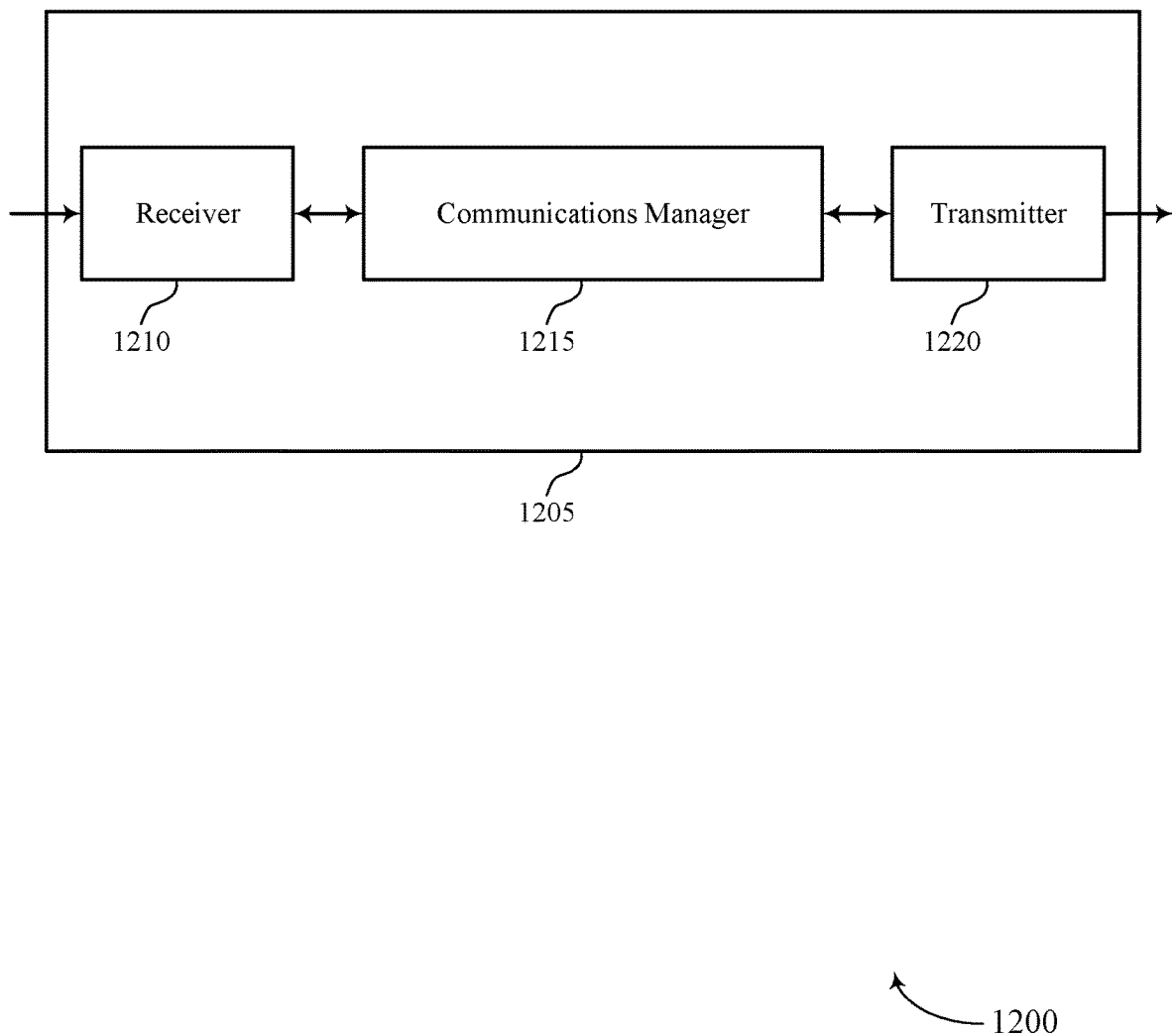
FIGS. 12 and 13 show block diagrams of devices that support sidelink timing control in accordance with aspects of the present disclosure.

FIG. 12 shows a block diagram 1200 of a device 1205 that supports sidelink timing control in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to sidelink timing control, etc.). Information may be passed on to other components of the device 1205. The receiver 1210 may be an example of aspects of the transceiver 1520 described with reference to FIG. 15. The receiver 1210 may utilize a single antenna or a set of antennas.

In some cases, the communications manager 1215 may schedule a set of UEs with a set of sidelink communication resources and a set of access link communication resources, receive, from a first UE of the set of UEs in an access link communication resource of the set of access link communication resources, a timing adjustment request for sidelink transmissions from a second UE of the set of UEs to the first UE, and transmit timing adjustment information to the second UE for the sidelink transmissions from the second UE to the first UE based on the timing adjustment request. Additionally or alternatively, the communications manager 1215 may configure a time interval gap between a sidelink communication resource and a subsequent access link communication resource, schedule a set of UEs with a set of sidelink communication resources and a set of access link communication resources based on the configured time interval gap, and communicate with the set of UEs using the set of access link communication resources based on the configured time interval gap. The communications manager 1215 may be an example of aspects of the communications manager 1510 described herein.

The actions performed by the communications manager 1215 as described herein may be implemented to realize one or more potential advantages. For example, transmitting timing adjustment information to a second UE based on a timing adjustment request received from a first UE 115 may allow a base station 105 to improve transmission reliability between the UEs 115 on a sidelink. Further, configuring a time interval gap between a sidelink communication resource and a subsequent access link communication resource may improve transmission reliability between the UEs 115 on the sidelink. These improvements may reduce or avoid resource overlap between sidelink reception at the first UE 115 and downlink reception at the first UE 115. By reducing or avoiding the overlap, the first UE 115 may improve reception reliability of downlink transmissions from the base station 105, improving downlink transmission reliability at the base station 105 and reducing overhead (e.g., due to retransmissions) on the downlink channel.

Based on transmitting timing adjustment information and/or configuring a time interval gap between sidelink and access link resources, a processor of the base station 105 (e.g., a processor controlling the receiver 1210, the communications manager 1215, the transmitter 1220, etc.) may reduce processing resources used for downlink retransmission. For example, modifying the sidelink transmission timing adjustment value for a second UE 115 transmitting on the sidelink to a first UE 115 may improve downlink transmission reliability to the first UE 115 (e.g., based on resolving scheduling conflicts). As such, the base station 105 may reduce the number of retransmissions used to successfully transmit messages on the downlink to the first UE 115. Reducing the number of retransmissions may reduce a number of times the processor ramps up processing power and turns on processing units to handle downlink message encoding and/or transmission. This reduced number of retransmissions may also reduce signaling overhead on the downlink channel (e.g., in addition to reducing the processing overhead at the processor).

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
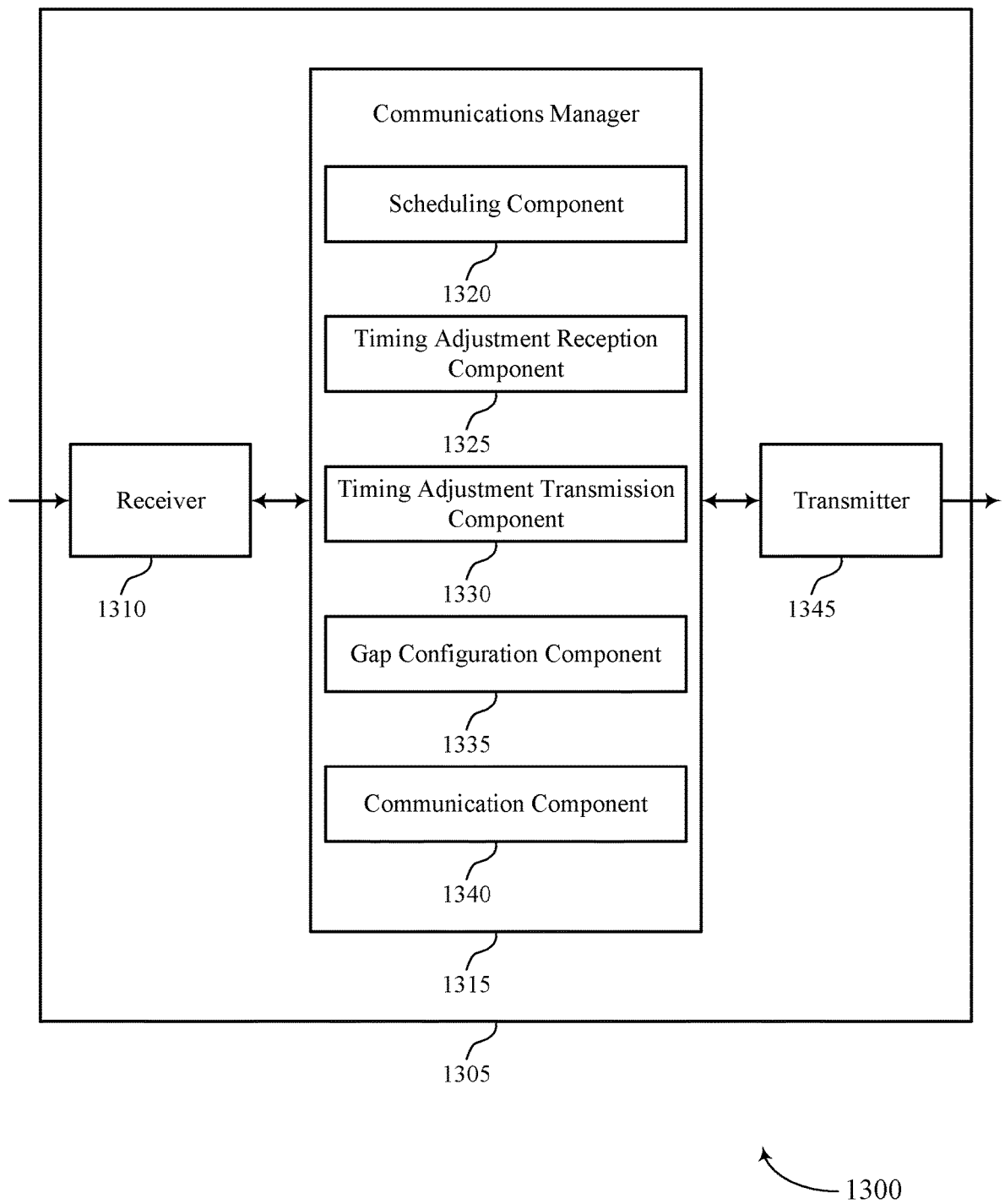

FIG. 13 shows a block diagram 1300 of a device 1305 that supports sidelink timing control in accordance with aspects of the present disclosure. The device 1305 may be an example of aspects of a device 1205, or a base station 105 as described herein. The device 1305 may include a receiver 1310, a communications manager 1315, and a transmitter 1345. The device 1305 may also include a processor. Each of these components may be in communication with one another (e.g., via one or more buses).

The receiver 1310 may receive information such as packets, user data, or control information associated with various information channels (e.g., control channels, data channels, and information related to sidelink timing control, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a scheduling component 1320, a timing adjustment reception component 1325, a timing adjustment transmission component 1330, a gap configuration component 1335, a communication component 1340, or any combination of these components. The communications manager 1315 may be an example of aspects of the communications manager 1510 described herein.

In some implementations, the scheduling component 1320 may schedule a set of UEs with a set of sidelink communication resources and a set of access link communication resources. The timing adjustment reception component 1325 may receive, from a first UE of the set of UEs in an access link communication resource of the set of access link communication resources, a timing adjustment request for sidelink transmissions from a second UE of the set of UEs to the first UE. The timing adjustment transmission component 1330 may transmit timing adjustment information to the second UE for the sidelink transmissions from the second UE to the first UE based on the timing adjustment request.

Additionally or alternatively, the gap configuration component 1335 may configure a time interval gap between a sidelink communication resource and a subsequent access link communication resource. The scheduling component 1320 may schedule a set of UEs with a set of sidelink communication resources and a set of access link communication resources based on the configured time interval gap. The communication component 1340 may communicate with the set of UEs using the set of access link communication resources based on the configured time interval gap.

The transmitter 1345 may transmit signals generated by other components of the device 1305. In some examples, the transmitter 1345 may be collocated with a receiver 1310 in a transceiver module. For example, the transmitter 1345 may be an example of aspects of the transceiver 1520 described with reference to FIG. 15. The transmitter 1345 may utilize a single antenna or a set of antennas.

Figure 14:
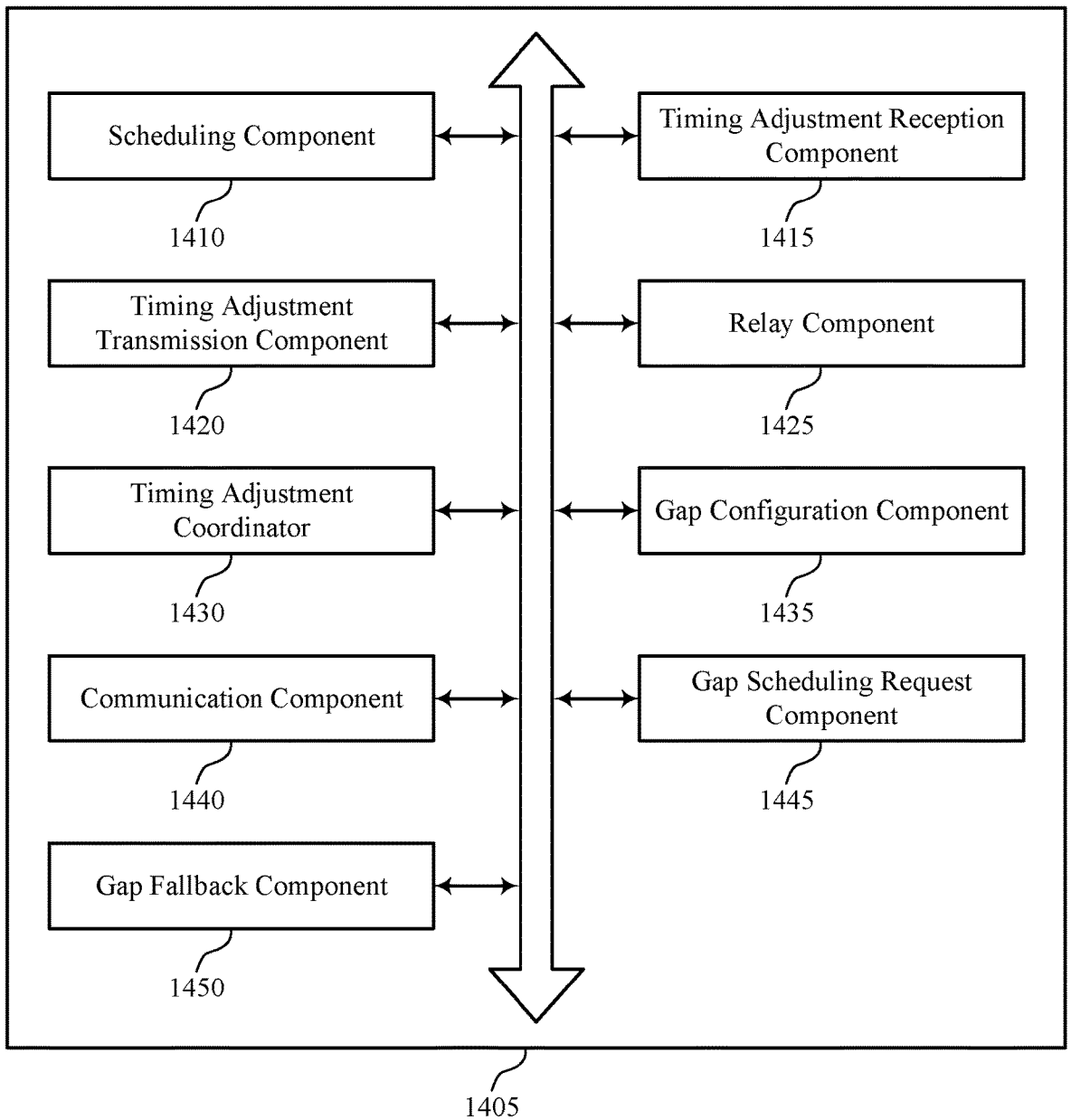
FIG. 14 shows a block diagram of a communications manager that supports sidelink timing control in accordance with aspects of the present disclosure.

FIG. 14 shows a block diagram 1400 of a communications manager 1405 that supports sidelink timing control in accordance with aspects of the present disclosure. The communications manager 1405 may be an example of aspects of a communications manager 1215, a communications manager 1315, or a communications manager 1510 described herein. The communications manager 1405 may include a scheduling component 1410, a timing adjustment reception component 1415, a timing adjustment transmission component 1420, a relay component 1425, a timing adjustment coordinator 1430, a gap configuration component 1435, a communication component 1440, a gap scheduling request component 1445, a gap fallback component 1450, or some combination thereof. Each of these modules may communicate, directly or indirectly, with one another (e.g., via one or more buses).

In a first implementation, the scheduling component 1410 may schedule a set of UEs with a set of sidelink communication resources and a set of access link communication resources. The timing adjustment reception component 1415 may receive, from a first UE of the set of UEs in an access link communication resource of the set of access link communication resources, a timing adjustment request for sidelink transmissions from a second UE of the set of UEs to the first UE. In some cases, the timing adjustment request may be a component of one or more of an RRC message, a MAC CE, PHY layer signaling, or a timing advance command. The timing adjustment transmission component 1420 may transmit timing adjustment information to the second UE for the sidelink transmissions from the second UE to the first UE based on the timing adjustment request.

In some cases, transmitting the timing adjustment information may involve the relay component 1425 relaying the timing adjustment request to the second UE.

The timing adjustment coordinator 1430 may determine a timing adjustment command for the sidelink transmissions from the second UE to the first UE based on the timing adjustment request, where transmitting the timing adjustment information may include transmitting the timing adjustment command to the second UE.

In some examples, receiving the timing adjustment request may involve the timing adjustment coordinator 1430 receiving a set of timing adjustment requests for a set of sidelink transmissions, where the timing adjustment command is determined based on the set of timing adjustment requests. In some examples, the timing adjustment coordinator 1430 may calculate a set of timing adjustment values for sidelink transmissions between the set of UEs based on the set of timing adjustment requests and one or more of a centralized algorithm, a centralized lookup table, or a centralized set of rules. In some of these examples, the timing adjustment coordinator 1430 may transmit a set of timing adjustment commands including the set of timing adjustment values to the set of UEs.

In a second implementation, the gap configuration component 1435 may configure a time interval gap between a sidelink communication resource and a subsequent access link communication resource. In some examples, the gap configuration component 1435 may determine a length of the time interval gap in a time domain based on a cell size of the base station. The scheduling component 1410 may schedule a set of UEs with a set of sidelink communication resources and a set of access link communication resources based on the configured time interval gap. The communication component 1440 may communicate with the set of UEs using the set of access link communication resources based on the configured time interval gap.

The gap scheduling request component 1445 may receive, from a first UE of the set of UEs, a gap scheduling request, where the time interval gap is configured based on the gap scheduling request.

The timing adjustment reception component 1415 may receive, from a first UE of the set of UEs, a timing adjustment request for a sidelink between the first UE and a second UE, where the time interval gap is configured based on the timing adjustment request. For example, the gap fallback component 1450 may perform a process for calculating sidelink timing adjustment values for the set of UEs based on the timing adjustment request and may determine to configure the time interval gap based on an exception in the process for calculating the sidelink timing adjustment values.

Figure 15:
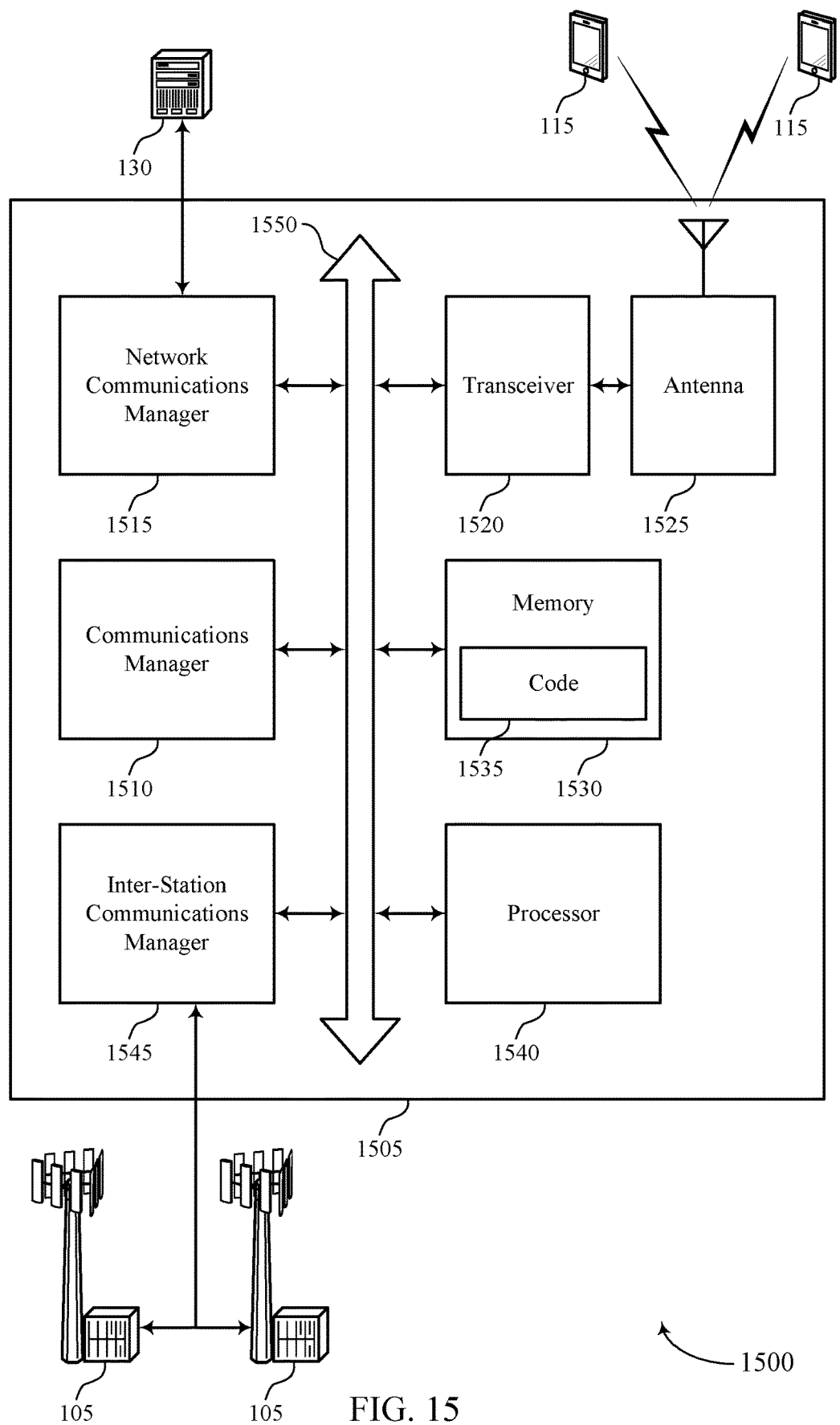
FIG. 15 shows a diagram of a system including a device that supports sidelink timing control in accordance with aspects of the present disclosure.

FIG. 15 shows a diagram of a system 1500 including a device 1505 that supports sidelink timing control in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may schedule a set of UEs with a set of sidelink communication resources and a set of access link communication resources, receive, from a first UE of the set of UEs in an access link communication resource of the set of access link communication resources, a timing adjustment request for sidelink transmissions from a second UE of the set of UEs to the first UE, and transmit timing adjustment information to the second UE for the sidelink transmissions from the second UE to the first UE based on the timing adjustment request. Additionally or alternatively, the communications manager 1510 may configure a time interval gap between a sidelink communication resource and a subsequent access link communication resource, schedule a set of UEs with a set of sidelink communication resources and a set of access link communication resources based on the configured time interval gap, and communicate with the set of UEs using the set of access link communication resources based on the configured time interval gap.

The network communications manager 1515 may manage communications with the core network 130 (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting sidelink timing control).

The inter-station communications manager 1545 may manage communications with other base station 105 and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
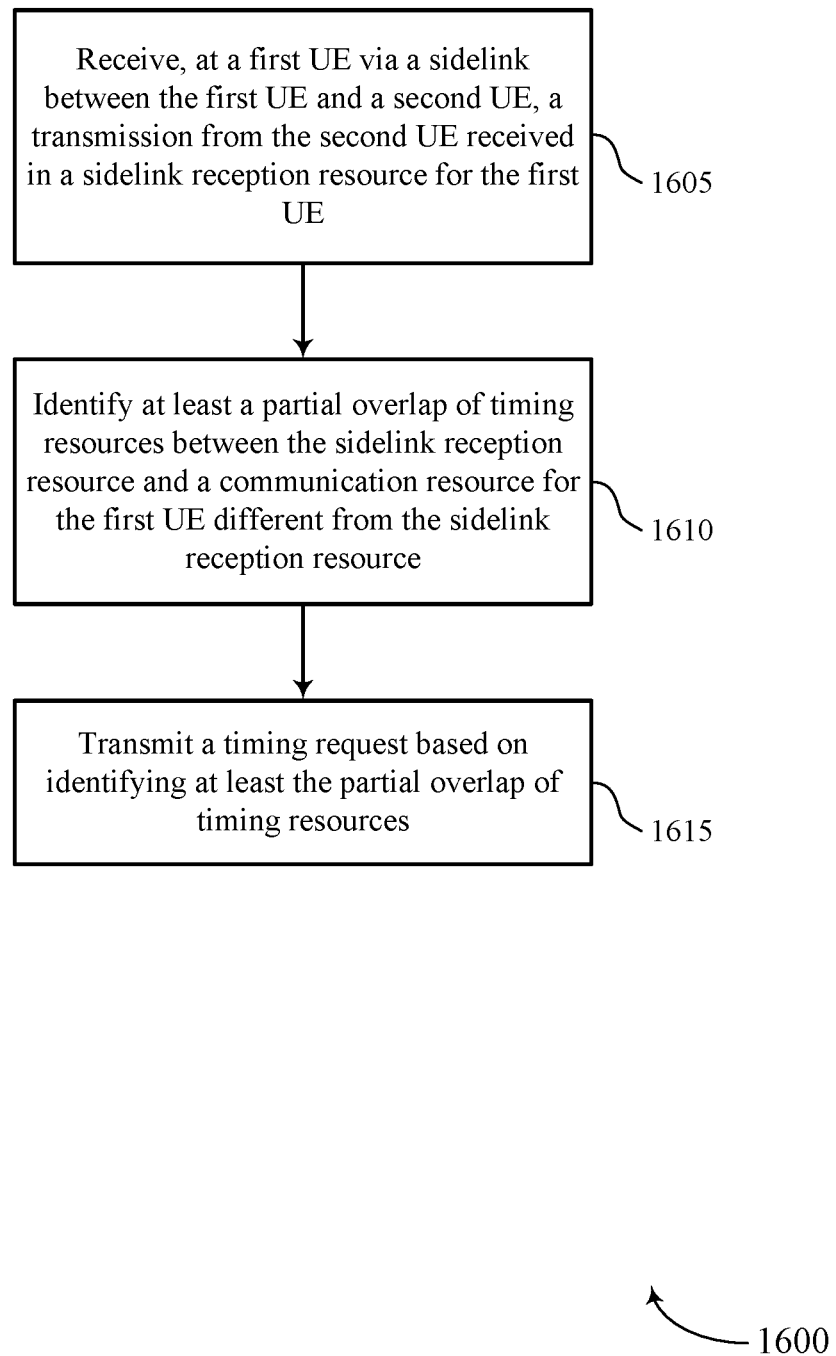
FIGS. 16 through 19 show flowcharts illustrating methods that support sidelink timing control in accordance with aspects of the present disclosure.

FIG. 16 shows a flowchart illustrating a method 1600 that supports sidelink timing control in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1605, the UE (i.e., a first UE) may receive, via a sidelink between the first UE and a second UE, a transmission from the second UE received in a sidelink reception resource for the first UE. The operations of 1605 may be performed according to the methods described herein. In some examples, aspects of the operations of 1605 may be performed by a sidelink reception component as described with reference to FIGS. 8 through 11.

At 1610, the UE may identify at least a partial overlap of timing resources between the sidelink reception resource and a communication resource for the first UE different from the sidelink reception resource. The operations of 1610 may be performed according to the methods described herein. In some examples, aspects of the operations of 1610 may be performed by an overlap identifier as described with reference to FIGS. 8 through 11.

At 1615, the UE may transmit a timing request based on identifying at least the partial overlap of timing resources. The operations of 1615 may be performed according to the methods described herein. In some examples, aspects of the operations of 1615 may be performed by a timing request component as described with reference to FIGS. 8 through 11.

Figure 17:
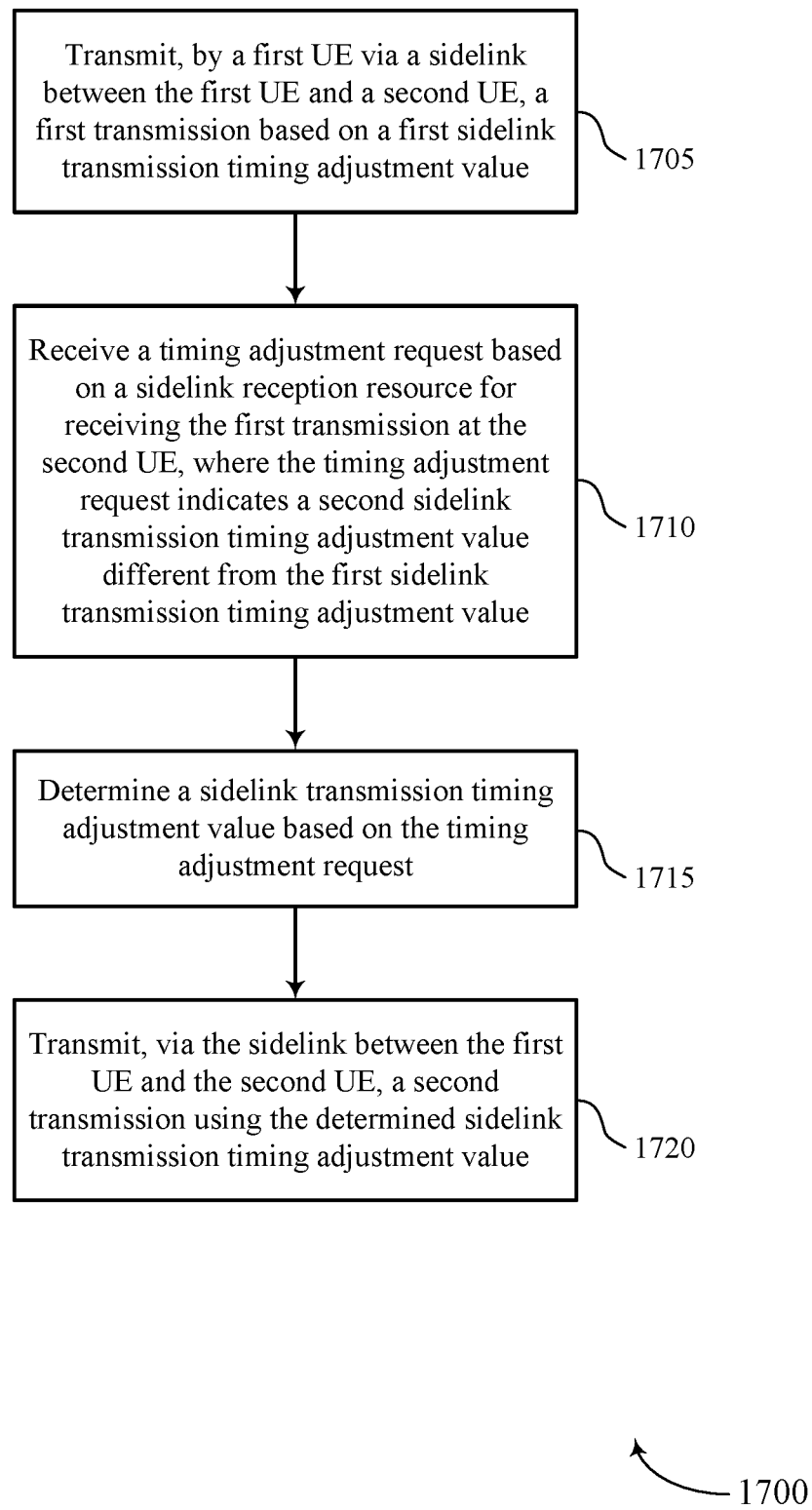

FIG. 17 shows a flowchart illustrating a method 1700 that supports sidelink timing control in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1705, the UE (i.e., a first UE) may transmit, via a sidelink between the first UE and a second UE, a first transmission based on a first sidelink transmission timing adjustment value. The operations of 1705 may be performed according to the methods described herein. In some examples, aspects of the operations of 1705 may be performed by a sidelink transmission component as described with reference to FIGS. 8 through 11.

At 1710, the UE may receive a timing adjustment request based on a sidelink reception resource for receiving the first transmission at the second UE, where the timing adjustment request indicates a second sidelink transmission timing adjustment value different from the first sidelink transmission timing adjustment value. The operations of 1710 may be performed according to the methods described herein. In some examples, aspects of the operations of 1710 may be performed by a timing adjustment reception component as described with reference to FIGS. 8 through 11.

At 1715, the UE may determine a sidelink transmission timing adjustment value based on the timing adjustment request. The operations of 1715 may be performed according to the methods described herein. In some examples, aspects of the operations of 1715 may be performed by a timing adjustment determination component as described with reference to FIGS. 8 through 11.

At 1720, the UE may transmit, via the sidelink between the first UE and the second UE, a second transmission using the determined sidelink transmission timing adjustment value. The operations of 1720 may be performed according to the methods described herein. In some examples, aspects of the operations of 1720 may be performed by a sidelink transmission component as described with reference to FIGS. 8 through 11.

Figure 18:
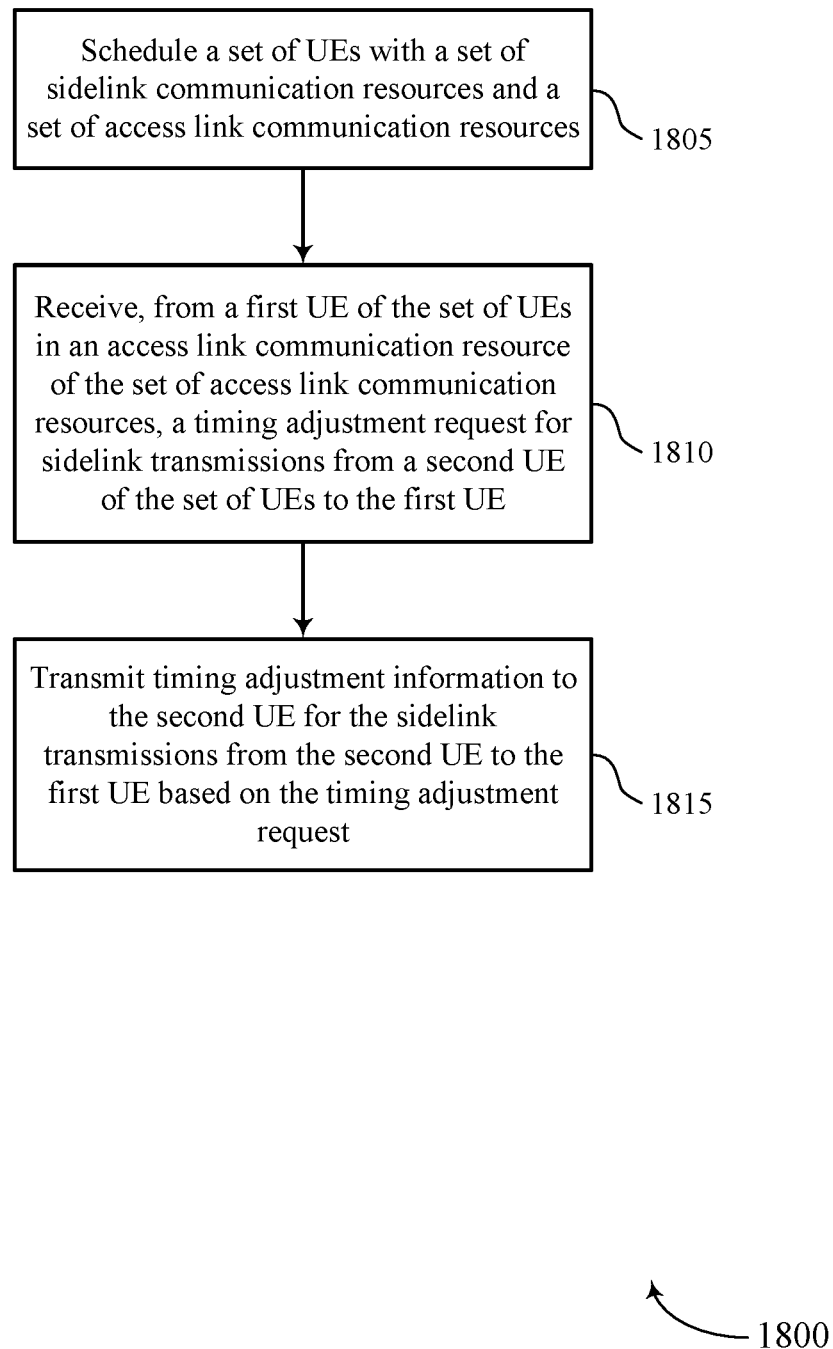

FIG. 18 shows a flowchart illustrating a method 1800 that supports sidelink timing control in accordance with aspects of the present disclosure. The operations of method 1800 may be implemented by a base station 105 or its components as described herein. For example, the operations of method 1800 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 1805, the base station may schedule a set of UEs with a set of sidelink communication resources and a set of access link communication resources. The operations of 1805 may be performed according to the methods described herein. In some examples, aspects of the operations of 1805 may be performed by a scheduling component as described with reference to FIGS. 12 through 15.

At 1810, the base station may receive, from a first UE of the set of UEs in an access link communication resource of the set of access link communication resources, a timing adjustment request for sidelink transmissions from a second UE of the set of UEs to the first UE. The operations of 1810 may be performed according to the methods described herein. In some examples, aspects of the operations of 1810 may be performed by a timing adjustment reception component as described with reference to FIGS. 12 through 15.

At 1815, the base station may transmit timing adjustment information to the second UE for the sidelink transmissions from the second UE to the first UE based on the timing adjustment request. The operations of 1815 may be performed according to the methods described herein. In some examples, aspects of the operations of 1815 may be performed by a timing adjustment transmission component as described with reference to FIGS. 12 through 15.

Figure 19:
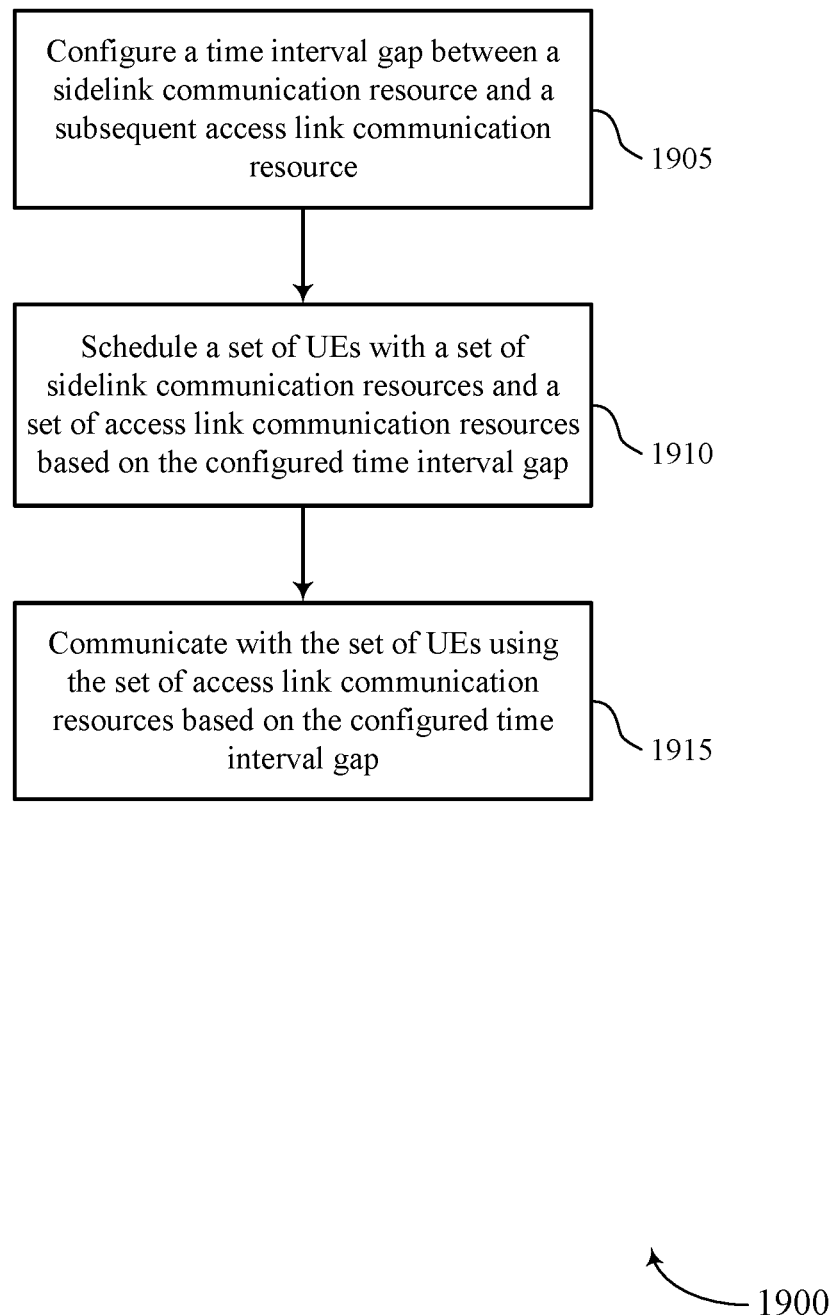

FIG. 19 shows a flowchart illustrating a method 1900 that supports sidelink timing control in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 1905, the base station may configure a time interval gap between a sidelink communication resource and a subsequent access link communication resource. The operations of 1905 may be performed according to the methods described herein. In some examples, aspects of the operations of 1905 may be performed by a gap configuration component as described with reference to FIGS. 12 through 15.

At 1910, the base station may schedule a set of UEs with a set of sidelink communication resources and a set of access link communication resources based on the configured time interval gap. The operations of 1910 may be performed according to the methods described herein. In some examples, aspects of the operations of 1910 may be performed by a scheduling component as described with reference to FIGS. 12 through 15.

At 1915, the base station may communicate with the set of UEs using the set of access link communication resources based on the configured time interval gap. The operations of 1915 may be performed according to the methods described herein. In some examples, aspects of the operations of 1915 may be performed by a communication component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Described herein are a number of examples of methods, systems or apparatuses including means for implementing methods or realizing apparatuses, non-transitory computer-readable medium storing instructions executable by one or more processors to cause the one or more processors to implement methods, and systems including one or more processors and memory in electronic communication with the one or more processors storing instructions executable by the one or more processors to cause the system or apparatus to implement methods. The following examples are given by way of illustration. Aspects of the following examples may be combined with aspects or embodiments shown or discussed in relation to the figures or elsewhere herein. It is to be understood that these are just some examples of possible implementations, and other examples will be readily apparent to those skilled in the art without departing from the scope of the disclosure.

Example 1 is a method for wireless communications at a first UE that includes receiving, via a sidelink between the first UE and a second UE, a transmission from the second UE received in a sidelink reception resource for the first UE, identifying at least a partial overlap of timing resources between the sidelink reception resource and a communication resource for the first UE different from the sidelink reception resource, and transmitting a timing request based on identifying at least the partial overlap of timing resources.

In example 2, the method of example 1 includes generating the timing request, where the timing request includes a timing adjustment request for the second UE.

In example 3, the transmission of example 2 is received in the sidelink reception resource based on a first sidelink transmission timing adjustment value for the second UE. The method of example 3 includes indicating a second sidelink transmission timing adjustment value different from the first sidelink transmission timing adjustment value in the timing adjustment request.

In example 4, the second sidelink transmission timing adjustment value of example 3 is greater than the first sidelink transmission timing adjustment value.

In example 5, the first sidelink transmission timing adjustment value of either of examples 3 or 4 is a first timing adjustment value and the second sidelink transmission timing adjustment value of either of examples 3 or 4 is a second timing adjustment value.

In example 6, the method of any of examples 1-6 includes generating the timing request, where the timing request includes a gap scheduling request for a base station serving the first UE.

In example 7, the method of example 6 includes receiving, from the base station and based on the gap scheduling request, an indication of a scheduled time interval gap between a sidelink communication resource and a subsequent access link communication resource.

In example 8, the length of the scheduled time interval gap in a time domain of example 7 is based a cell size of the base station.

In example 9, the method of any of examples 1-8 includes transmitting an updated timing request based on a change to the sidelink between the first UE and the second UE.

In example 10, the timing request of examples 1-9 is transmitted to one or both of a base station serving the first UE via an access link or the second UE via the sidelink.

In example 11, the timing request of examples 1-10 includes one or more of an RRC message, a MAC CE, PHY layer signaling, or a timing advance command.

Example 12 is a system or apparatus including means for implementing a method or realizing an apparatus as in any of examples 1-11.

Example 13 is a non-transitory computer-readable medium storing instructions executable by one or more processors to cause the one or more processors to implement a method as in any of examples 1-11.

Example 14 is a system including one or more processors and memory in electronic communication with the one or more processors storing instructions executable by the one or more processors to cause the system or apparatus to implement a method as in any of examples 1-11.

Example 15 is a method for wireless communications at a first UE that includes transmitting, via a sidelink between the first UE and a second UE, a first transmission based on a first sidelink transmission timing adjustment value, receiving a timing adjustment request based on a sidelink reception resource for receiving the first transmission at the second UE, where the timing adjustment request indicates a second sidelink transmission timing adjustment value different from the first sidelink transmission timing adjustment value, determining a sidelink transmission timing adjustment value based on the timing adjustment request, and transmitting, via the sidelink between the first UE and the second UE, a second transmission using the determined sidelink transmission timing adjustment value.

In example 16, determining the sidelink transmission timing adjustment value of example 15 includes selecting the sidelink transmission timing adjustment value from a set of potential sidelink transmission timing adjustment values including one or more of the first sidelink transmission timing adjustment value, the second sidelink transmission timing adjustment value, or one or more additional sidelink transmission timing adjustment values different from both the first sidelink transmission timing adjustment value and the second sidelink transmission timing adjustment value.

In example 17, the method of either of examples 15 or 16 includes selecting the first sidelink transmission timing adjustment value independent of the second UE.

In example 18, the method of any of examples 15-17 includes transmitting, via an additional sidelink between the first UE and a third UE, a third transmission based on a third sidelink transmission timing adjustment value different from the first sidelink transmission timing adjustment value and the second sidelink transmission timing adjustment value.

In example 19, the method of example 18 includes storing both the determined sidelink transmission timing adjustment value for the sidelink between the first UE and the second UE and the third sidelink transmission timing adjustment value for the additional sidelink between the first UE and the third UE in a lookup table in memory, where the lookup table in memory includes a set of sidelink transmission timing adjustment values for a set of respective sidelinks between the first UE and a set of UEs.

In example 20, the method of any of examples 15-19 includes receiving an updated timing adjustment request based on a change to the sidelink between the first UE and the second UE, where the updated timing adjustment request indicates a third sidelink transmission timing adjustment value different from the second sidelink transmission timing adjustment value, and determining an updated sidelink transmission timing adjustment value based on the updated timing adjustment request.

In example 21, the timing adjustment request of any of examples 15-20 is received from one or both of a base station serving the first UE via an access link or the second UE via the sidelink.

In example 22, the timing adjustment request of any of examples 15-21 includes one or more of an RRC message, a MAC CE, PHY layer signaling, or a timing advance command.

Example 23 is a system or apparatus including means for implementing a method or realizing an apparatus as in any of examples 15-22.

Example 24 is a non-transitory computer-readable medium storing instructions executable by one or more processors to cause the one or more processors to implement a method as in any of examples 15-22.

Example 25 is a system including one or more processors and memory in electronic communication with the one or more processors storing instructions executable by the one or more processors to cause the system or apparatus to implement a method as in any of examples 15-22.

Example 26 is a method for wireless communications at a base station that includes scheduling a set of UEs with a set of sidelink communication resources and a set of access link communication resources, receiving, from a first UE of the set of UEs in an access link communication resource of the set of access link communication resources, a timing adjustment request for sidelink transmissions from a second UE of the set of UEs to the first UE, and transmitting timing adjustment information to the second UE for the sidelink transmissions from the second UE to the first UE based on the timing adjustment request.

In example 27, transmitting the timing adjustment information of example 26 includes relaying the timing adjustment request to the second UE.

In example 28, the method of either of examples 26 or 27 includes determining a timing adjustment command for the sidelink transmissions from the second UE to the first UE based on the timing adjustment request, where transmitting the timing adjustment information includes transmitting the timing adjustment command to the second UE.

In example 29, receiving the timing adjustment request of example 28 includes receiving a set of timing adjustment requests for a set of sidelink transmissions, where the timing adjustment command is determined based on the set of timing adjustment requests.

In example 30, the method of example 29 includes calculating a set of timing adjustment values for sidelink transmissions between the set of UEs based on the set of timing adjustment requests and one or more of a centralized algorithm, a centralized lookup table, or a centralized set of rules, and transmitting a set of timing adjustment commands including the set of timing adjustment values to the set of UEs.

In example 31, the timing adjustment request of any of examples 26-30 includes one or more of an RRC message, a MAC CE, PHY layer signaling, or a timing advance command.

Example 32 is a system or apparatus including means for implementing a method or realizing an apparatus as in any of examples 26-31.

Example 33 is a non-transitory computer-readable medium storing instructions executable by one or more processors to cause the one or more processors to implement a method as in any of examples 26-31.

Example 34 is a system including one or more processors and memory in electronic communication with the one or more processors storing instructions executable by the one or more processors to cause the system or apparatus to implement a method as in any of examples 26-31.

Example 35 is a method for wireless communications at a base station that includes configuring a time interval gap between a sidelink communication resource and a subsequent access link communication resource, scheduling a set of UEs with a set of sidelink communication resources and a set of access link communication resources based on the configured time interval gap, and communicating with the set of UEs using the set of access link communication resources based on the configured time interval gap.

In example 36, the method of example 35 includes receiving, from a first UE of the set of UEs, a gap scheduling request, where the time interval gap is configured based on the gap scheduling request.

In example 37, the method of either of examples 35 or 36 includes receiving, from a first UE of the set of UEs, a timing adjustment request for a sidelink between the first UE and a second UE, where the time interval gap is configured based on the timing adjustment request.

In example 38, the method of example 37 includes performing a process for calculating sidelink timing adjustment values for the set of UEs based on the timing adjustment request and determining to configure the time interval gap based on an exception in the process for calculating the sidelink timing adjustment values.

In example 39, the method of any of examples 35-38 includes determining a length of the time interval gap in a time domain based on a cell size of the base station.

Example 40 is a system or apparatus including means for implementing a method or realizing an apparatus as in any of examples 35-39.

Example 41 is a non-transitory computer-readable medium storing instructions executable by one or more processors to cause the one or more processors to implement a method as in any of examples 35-39.

Example 42 is a system including one or more processors and memory in electronic communication with the one or more processors storing instructions executable by the one or more processors to cause the system or apparatus to implement a method as in any of examples 35-39.

Aspects of these examples may be combined with aspects or embodiments disclosed in other implementations.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
   receiving, via a sidelink between the first UE and a second UE, a transmission from the second UE received in a sidelink reception resource for the first UE;
   identifying at least a partial overlap of timing resources between the sidelink reception resource and a communication resource for the first UE different from the sidelink reception resource; and
   transmitting a timing request based at least in part on identifying at least the partial overlap of timing resources, wherein the timing request comprises a request to adjust, by another wireless device, a timing of communications at the first UE.

2. The method of claim 1, further comprising:
   generating the timing request comprising a timing adjustment request for the second UE.

3. The method of claim 2, wherein the transmission is received in the sidelink reception resource based at least in part on a first sidelink transmission timing adjustment value for the second UE, the method further comprising:
   indicating a second sidelink transmission timing adjustment value different from the first sidelink transmission timing adjustment value in the timing adjustment request.

4. The method of claim 3, wherein the second sidelink transmission timing adjustment value is greater than the first sidelink transmission timing adjustment value.

5. The method of claim 3, wherein:
   the first sidelink transmission timing adjustment value comprises a first timing advance value; and
   the second sidelink transmission timing adjustment value comprises a second timing advance value.

6. The method of claim 1, further comprising:
   generating the timing request, wherein the timing request comprises a gap scheduling request for a base station serving the first UE.

7. The method of claim 6, further comprising:
   receiving, from the base station and based at least in part on the gap scheduling request, an indication of a scheduled time interval gap between a sidelink communication resource and a subsequent access link communication resource.

8. The method of claim 7, wherein a length of the scheduled time interval gap in a time domain is based at least in part on a cell size of the base station.

9. The method of claim 1, further comprising:
transmitting an updated timing request based at least in part on a change to the sidelink between the first UE and the second UE.

10. The method of claim 1, wherein the timing request is transmitted to one or both of a base station serving the first UE via an access link or the second UE via the sidelink.

11. The method of claim 1, wherein the timing request comprises one or more of a radio resource control message, a medium access control control element, physical layer signaling, or a timing advance command.

12. A method for wireless communications at a first user equipment (UE), comprising:
transmitting, via a sidelink between the first UE and a second UE, a first transmission based at least in part on a first sidelink transmission timing adjustment value;
receiving a timing adjustment request based at least in part on a sidelink reception resource for receiving the first transmission at the second UE, wherein the timing adjustment request indicates a second sidelink transmission timing adjustment value different from the first sidelink transmission timing adjustment value;
selecting, based at least in part on the timing adjustment request, a sidelink transmission timing adjustment value from a set of potential sidelink transmission timing adjustment values comprising one or more of the first sidelink transmission timing adjustment value, the second sidelink transmission timing adjustment value, or one or more additional sidelink transmission timing adjustment values different from both the first sidelink transmission timing adjustment value and the second sidelink transmission timing adjustment value; and
transmitting, via the sidelink between the first UE and the second UE, a second transmission using the sidelink transmission timing adjustment value.

13. The method of claim 12, further comprising:
selecting the first sidelink transmission timing adjustment value independent of the second UE.

14. The method of claim 12, further comprising:
transmitting, via an additional sidelink between the first UE and a third UE, a third transmission based at least in part on a third sidelink transmission timing adjustment value different from the first sidelink transmission timing adjustment value and the second sidelink transmission timing adjustment value.

15. The method of claim 14, further comprising:
storing both the sidelink transmission timing adjustment value for the sidelink between the first UE and the second UE and the third sidelink transmission timing adjustment value for the additional sidelink between the first UE and the third UE in a lookup table in memory, wherein the lookup table in memory comprises a plurality of sidelink transmission timing adjustment values for a plurality of respective sidelinks between the first UE and a plurality of UEs.

16. The method of claim 12, further comprising:
receiving an updated timing adjustment request based at least in part on a change to the sidelink between the first UE and the second UE, wherein the updated timing adjustment request indicates a third sidelink transmission timing adjustment value different from the second sidelink transmission timing adjustment value; and
determining an updated sidelink transmission timing adjustment value based at least in part on the updated timing adjustment request.

17. The method of claim 12, wherein the timing adjustment request is received from one or both of a base station serving the first UE via an access link or the second UE via the sidelink.

18. The method of claim 12, wherein the timing adjustment request comprises one or more of a radio resource control message, a medium access control control element, physical layer signaling, or a timing advance command.

19. An apparatus for wireless communications at a first user equipment (UE), comprising:
a processor;
memory coupled with the processor; and
instructions stored in the memory and executable by the processor to cause the apparatus to:
receive, via a sidelink between the first UE and a second UE, a transmission from the second UE received in a sidelink reception resource for the first UE;
identify at least a partial overlap of timing resources between the sidelink reception resource and a communication resource for the first UE different from the sidelink reception resource; and
transmit a timing request based at least in part on identifying at least the partial overlap of timing resources, wherein the timing request comprises a request to adjust, by another wireless device, a timing of communications at the first UE.

20. The apparatus of claim 19, wherein the instructions are further executable by the processor to cause the apparatus to:
generate the timing request comprising a timing adjustment request for the second UE.

21. The apparatus of claim 19, wherein the transmission is received in the sidelink reception resource based at least in part on a first sidelink transmission timing adjustment value for the second UE, the instructions being further executable by the processor to cause the apparatus to:
indicate a second sidelink transmission timing adjustment value different from the first sidelink transmission timing adjustment value in a timing adjustment request.

22. The apparatus of claim 19, wherein the instructions are further executable by the processor to cause the apparatus to:
generate the timing request, wherein the timing request comprises a gap scheduling request for a base station serving the first UE.

23. The apparatus of claim 22, wherein the instructions are further executable by the processor to cause the apparatus to:
receive, from the base station and based at least in part on the gap scheduling request, an indication of a scheduled time interval gap between a sidelink communication resource and a subsequent access link communication resource.

24. The apparatus of claim 19, wherein the instructions are further executable by the processor to cause the apparatus to:
transmit an updated timing request based at least in part on a change to the sidelink between the first UE and the second UE.

25. An apparatus for wireless communications at a first user equipment (UE), comprising:
a processor;
memory coupled with the processor; and instructions stored in the memory and executable by the processor to cause the apparatus to:
- transmit, via a sidelink between the first UE and a second UE, a first transmission based at least in part on a first sidelink transmission timing adjustment value;
- receive a timing adjustment request based at least in part on a sidelink reception resource for receiving the first transmission at the second UE, wherein the timing adjustment request indicates a second sidelink transmission timing adjustment value different from the first sidelink transmission timing adjustment value;
- select, based at least in part on the timing adjustment request, a sidelink transmission timing adjustment value from a set of potential sidelink transmission timing adjustment values comprising one or more of the first sidelink transmission timing adjustment value, the second sidelink transmission timing adjustment value, or one or more additional sidelink transmission timing adjustment values different from both the first sidelink transmission timing adjustment value and the second sidelink transmission timing adjustment value; and
- transmit, via the sidelink between the first UE and the second UE, a second transmission using the sidelink transmission timing adjustment value.

26. The apparatus of claim 25, wherein the instructions are further executable by the processor to cause the apparatus to:
- select the first sidelink transmission timing adjustment value independent of the second UE.

27. The apparatus of claim 25, wherein the instructions are further executable by the processor to cause the apparatus to:
- transmit, via an additional sidelink between the first UE and a third UE, a third transmission based at least in part on a third sidelink transmission timing adjustment value different from the first sidelink transmission timing adjustment value and the second sidelink transmission timing adjustment value.

28. The apparatus of claim 25, wherein the instructions are further executable by the processor to cause the apparatus to:
- receive an updated timing adjustment request based at least in part on a change to the sidelink between the first UE and the second UE, wherein the updated timing adjustment request indicates a third sidelink transmission timing adjustment value different from the second sidelink transmission timing adjustment value; and
- determine an updated sidelink transmission timing adjustment value based at least in part on the updated timing adjustment request.

* * * * *